US012482325B2

(12) United States Patent
Chen

(10) Patent No.: US 12,482,325 B2
(45) Date of Patent: Nov. 25, 2025

(54) REVERSE DRIVE PROTECTION ASSEMBLY FOR A GAMING MACHINE HANDLE

(71) Applicant: Aristocrat Technologies, Inc., Las Vegas, NV (US)

(72) Inventor: Alvin Chen, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 324 days.

(21) Appl. No.: 18/226,066

(22) Filed: Jul. 25, 2023

(65) Prior Publication Data

US 2025/0037535 A1 Jan. 30, 2025

(51) Int. Cl.
*G07F 17/32* (2006.01)

(52) U.S. Cl.
CPC ...... *G07F 17/3216* (2013.01); *G07F 17/3204* (2013.01)

(58) Field of Classification Search
CPC ............. G07F 17/3216; G07F 17/3204; G07F 17/3202; G07F 17/3213
See application file for complete search history.

(56) References Cited

U.S. PATENT DOCUMENTS

| | | | |
|---|---|---|---|
| 4,426,082 A | 1/1984 | Heywood | |
| 4,524,636 A | 6/1985 | Nishikawa | |
| 4,597,309 A | 7/1986 | Nishikawa | |
| 6,325,720 B1 | 12/2001 | Tsukahara et al. | |
| 2012/0149468 A1 | 6/2012 | Menheere | |
| 2018/0032098 A1 * | 2/2018 | Sugiyama | G05G 5/06 |

FOREIGN PATENT DOCUMENTS

| | | | |
|---|---|---|---|
| GB | 2076204 A * | 11/1981 | G07F 17/34 |

* cited by examiner

*Primary Examiner* — Jasson H Yoo
(74) *Attorney, Agent, or Firm* — Weaver Austin Villeneuve & Sampson LLP

(57) ABSTRACT

A back-driving handle assembly for protecting a gaming machine from damage when the back-driving handle assembly is loaded in reverse. The back-driving handle assembly includes tuned counter-opposing springs and a ratchet plate with a specially designed tooth angle. The back-driving handle assembly allows normally locking ratchet and pawl to slip past some teeth on an overload condition, thus preserving functionalities of the back-driving handle assembly.

20 Claims, 20 Drawing Sheets

REVERSE DRIVE PROTECTION ASSEMBLY FOR A GAMING MACHINE HANDLE

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

To initiate games on gaming machines, a game machine actuator may be actuated (e.g., be pressed, pivoted, pulled, etc.) to operate or otherwise activate functions of the gaming machine, typically, from a non-operating state within a game. An actuator is actuated to generate, process, and/or transmit an electrical signal. The electrical signal is generated, processed and/or transmitted to a gaming machine controller, for example, to which the game machine actuator is connected. The gaming machine controller, in turn, activates function(s) of a game, at least in part, based on the electrical signal the gaming machine receives from the game machine actuator.

Current game machines employ handle assemblies that provide simple pull-actuation functionality. That is, such handle assemblies have a home or a position and a spin detection position to actuate a game action (e.g., pulling a machine handle to spin all of the reels). These handle assemblies are configured to prevent forcible reversal of the movement of the handle assembly back to the home position before the end of the lever's stroke. When the handle assembly receives sufficient force to drive reversal of the handle assembly to the home position, such pulling or pushing forces on these handle assemblies may result in various components in the handle assembly and/or the gaming machine itself being damaged, which may lead to inoperability of the handle assemblies and gaming machine.

When these handle assemblies malfunction and become inoperable, increasing costs are imposed on the operator and on a player who may be unable to control or play any games on gaming machines—all of which may lead to a loss of revenues. The malfunctioning handle assemblies typically must be entirely replaced, which involves time and effort for the replacement by field technicians.

Further limitations and disadvantages of conventional and traditional approaches will become apparent to one of skill in the art, through comparison of such systems and devices with some aspects of the present disclosure as set forth in the remainder of the present application with reference to the drawings.

SUMMARY

In an implementation, a gaming system or gaming device comprises an assembly for protecting internal components from damage when a respective handle is loaded in reverse or being pulled or pushed back to a home position. The handle assembly comprises a pair of tuned counter-opposing springs arranged with a ratchet plate and a specially configured tooth angle that allows a normally locking ratchet and pawl to slip past each other in a reverse loading condition toward a home position, while preserving functionalities of handle assembly.

In some examples, the instant disclosure provides a reverse drive protection assembly for a gaming handle on a gaming machine. The back-driving handle assembly includes a face plate operable to be fixed to the gaming machine, and ratchet plate on the face plate, the ratchet plate comprising a plurality of angled teeth, each of the plurality of angled teeth having a first side and a second side. The back-driving handle assembly also includes a hub attached to the face plate, the hub comprising a torsion spring, a return spring, and a reaction pin, defining at least one reaction hole, and being rotatable in a first direction from a first position with respect to the face plate, and rotatable from a second position in a second direction opposite the first direction to the first position, the reaction pin engaging the torsion spring that is attached to the at least one reaction hole, and the torsion spring counteracting the return spring thereby initiating a return bias for the hub to return to the first position. The reaction pin is operable to move over the first side of at least one of the plurality of angled teeth responsive to a first external torque being applied to move the hub in the first direction, and to move over the second side of at least one of the plurality of angled teeth responsive to a second external torque exceeding the return bias being applied to move the hub in the second direction.

In some aspects, the face plate further includes a dowel abutting against the return spring to counteract the torsion spring to rotatably return the hub back to the first position.

In some aspects, the return spring is tuned to balance the torsion spring.

In some aspects, the first side has a first slope determined from an angle of contact with the reaction pin, and the second side has a second slope that is different from the first slope.

In some aspects, the first slope is larger than the second slope.

In some aspects, the back-driving handle further includes a plurality of sensors operable to contact the reaction pin when the hub is rotated to determine whether the hub is at the first position or away from the first position.

In some aspects, the reaction pin is operable to glide past the second side of at least one of the plurality of angled teeth when the second external torque in the second direction is greater than the return bias, and to be restrained by the second side when the second external torque in the second direction is less than the return bias.

In some examples, the instant disclosure provides a gaming machine that includes a cabinet, and a face plate fixed to the cabinet, having a ratchet plate, the ratchet plate including a plurality of angled teeth, each of the plurality of angled teeth having a first side and a second side. The gaming machine also includes a lever assembly coupled to the face plate, having a return spring, and being rotatable between a first direction with respect to a first position, and a second direction opposite the first direction, responsive to an external torque in a respective direction. The gaming machine also includes a pawl rotatably fixed to the lever assembly, and having a reaction pin attached to a torsion spring, the torsion spring counteracting the return spring to initiate a return bias to return the lever assembly to the first position, and the reaction pin being biased with the torsion spring to slide over the first side of at least one of the plurality of angled teeth responsive to the external torque moving in the first direction, and to slip past the second side of at least one of the plurality of angled teeth responsive to the external torque exceeding the return bias in the second direction.

In some aspects, the face plate further includes a dowel abutting against the return spring to counteract the torsion spring to move the lever assembly towards the first position.

In some aspects, the return spring is tuned to balance the torsion spring.

In some aspects, the first side has a first slope with respect to from an angle of contact with the reaction pin, and the second side has a second slope that is different from the first slope.

In some aspects, the first slope is larger than the second slope.

In some aspects, the gaming machine further includes a plurality of sensors operable to contact the reaction pin when the lever assembly is rotated to determine whether the lever assembly is at the first position or away from the first position.

In some aspects, the reaction pin is operable to slip past the second side of at least one of the plurality of angled teeth when the external torque in the second direction is greater than the return bias, and to be restrained by the second side when the external torque in the second direction is less than the return bias.

In some examples, the instant disclosure provides method of assembling a gaming machine having a cabinet. The method includes securing a ratchet plate having a plurality of angled teeth to a face plate, the face plate defining a first position, each of the plurality of angled teeth having a first side and a second side, and biasing a reaction pin against a torsion spring in a hub such that the reaction pin is biased outwardly, the hub being movable between a first direction from the first position, and a second direction opposite the first direction, responsive to an external torque in a respective direction. The method also includes counteracting the torsion spring with a return spring generating a return bias to rotatably return the hub to the first position, rotatably coupling the hub to the face plate, the reaction pin being biased against one of the plurality of angled teeth, such that the reaction pin is operable to slide over the first side of at least one of the plurality of angled teeth responsive to the external torque moving in the first direction, and to slip past the second side of at least one of the plurality of angled teeth responsive to the external torque exceeding the return bias in the second direction, and securing the face plate to the cabinet.

In some aspects, the method further includes abutting the return spring against a dowel on the face plate to counteract the torsion spring to move the hub towards the first position.

In some aspects, the method further includes tuning the return spring to balance the torsion spring.

In some aspects, the first side has a first slope determined from an angle of contact with the reaction pin, and the second side has a second slope that is different from the first slope, and wherein the first slope is larger than the second slope.

In some aspects, the method further includes determining with a plurality of sensors whether the hub is at the first position or displaced from the first position.

In some aspects, the reaction pin is operable to slip past the second side of at least one of the plurality of angled teeth when the external torque in the second direction is greater than the return bias, and to be restrained by the second side when the external torque in the second direction is less than the return bias.

DETAILED DESCRIPTION

Implementations of the present disclosure represent a technical improvement in the art of gaming technology. Specifically, the implementations illustrated address the technical problem of current handle assemblies of gaming machines that limit or prevent reverse handle assembly loading, which, when so loaded in reverse with excessive force or torque, leads to damage or malfunction.

Implementations of the present disclosure employ a back-driving handle assembly for protecting an electronic gaming machine and the handle assembly from damage when the back-driving handle assembly is reverse loaded. The back-driving handle assembly comprises one or more pairs of tuned counter-opposing springs within a hub, and a ratchet plate with a plurality of angled teeth fixed to a face plate. The back-driving handle assembly is removably connected to the gaming machine at the face plate, and allows normally locking ratchet and pawl to slip past angled teeth in a reversed, overload condition, thus preserving functionalities of the back-driving handle assembly.

Figure 1:
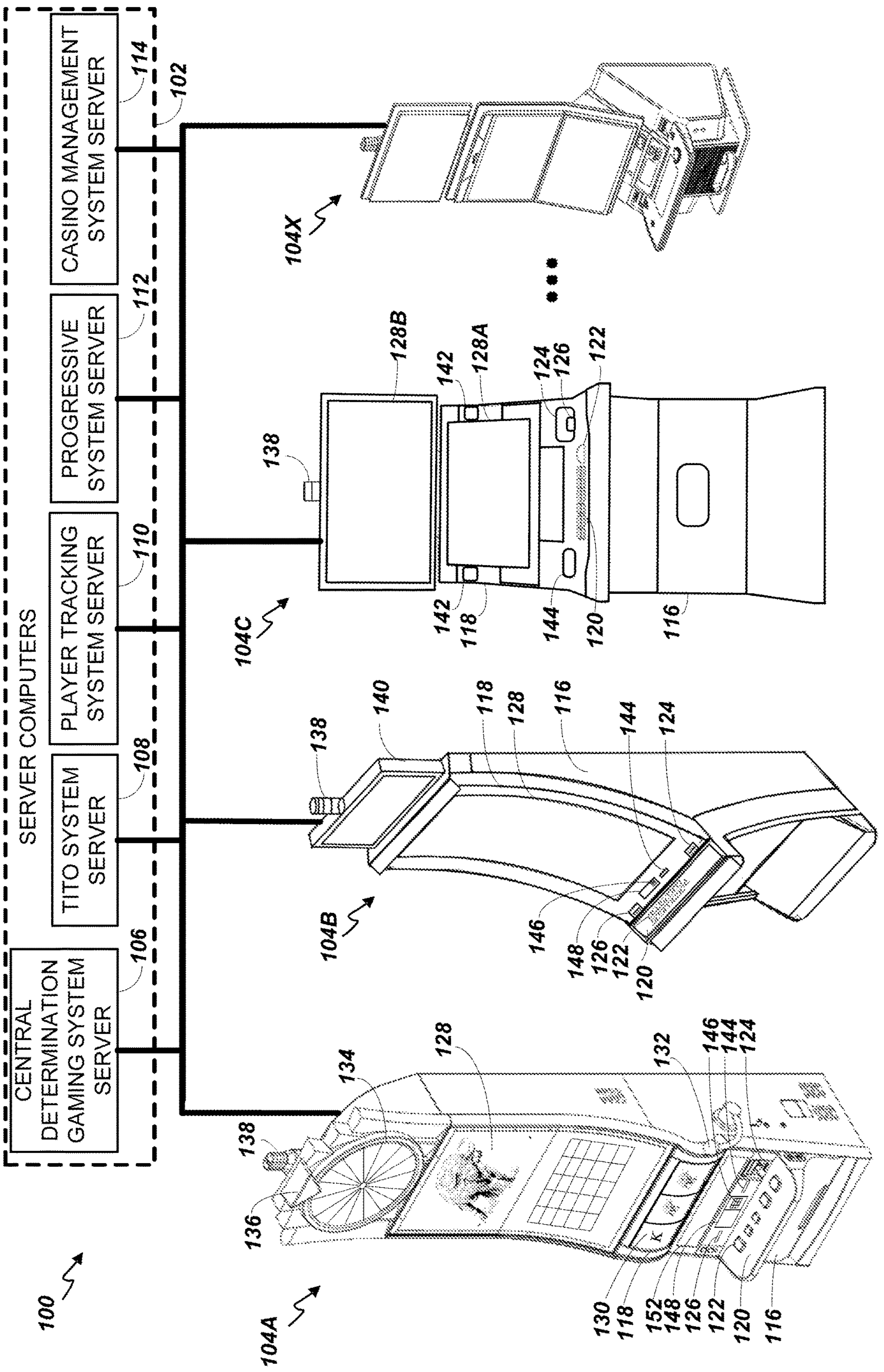
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
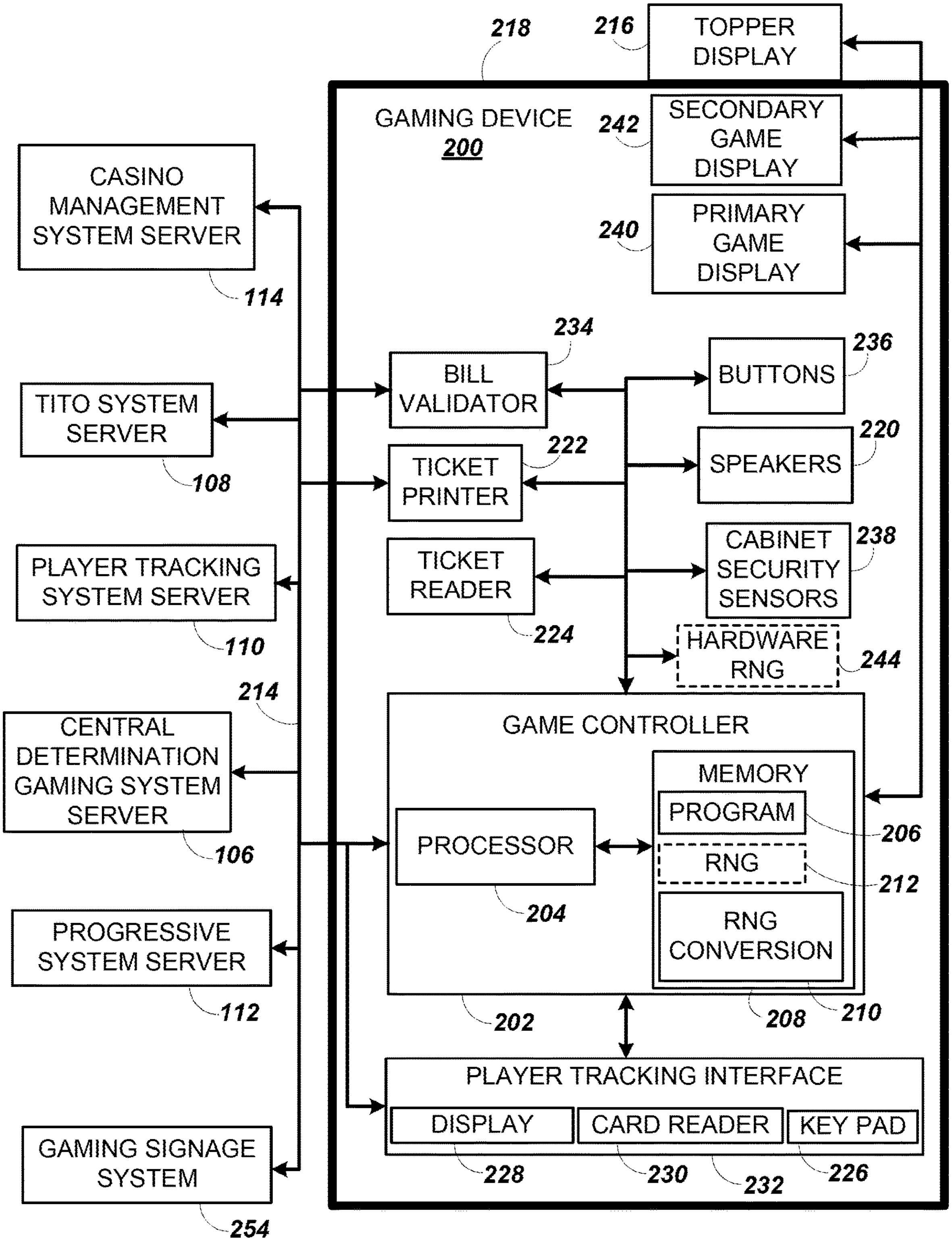
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS R system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
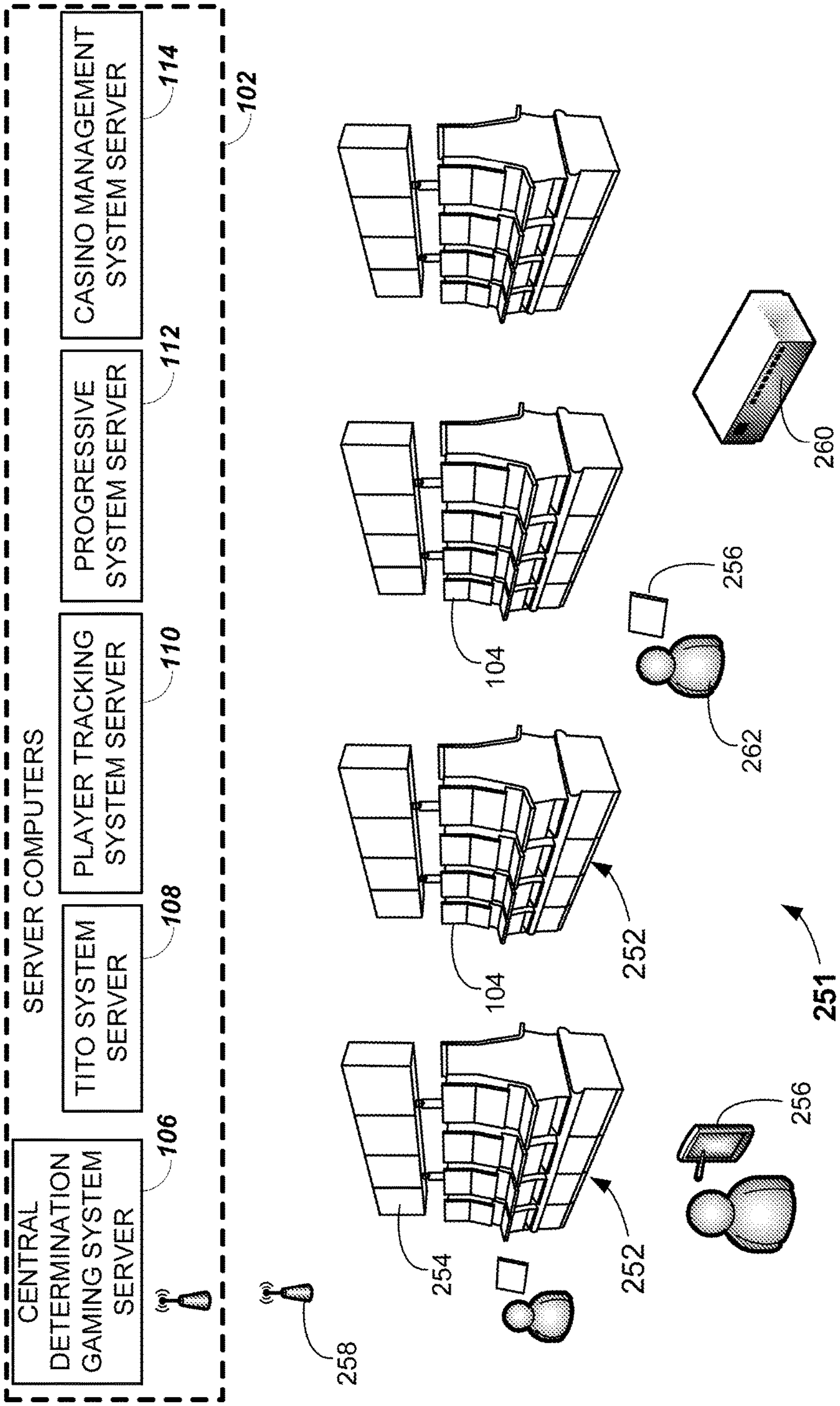
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
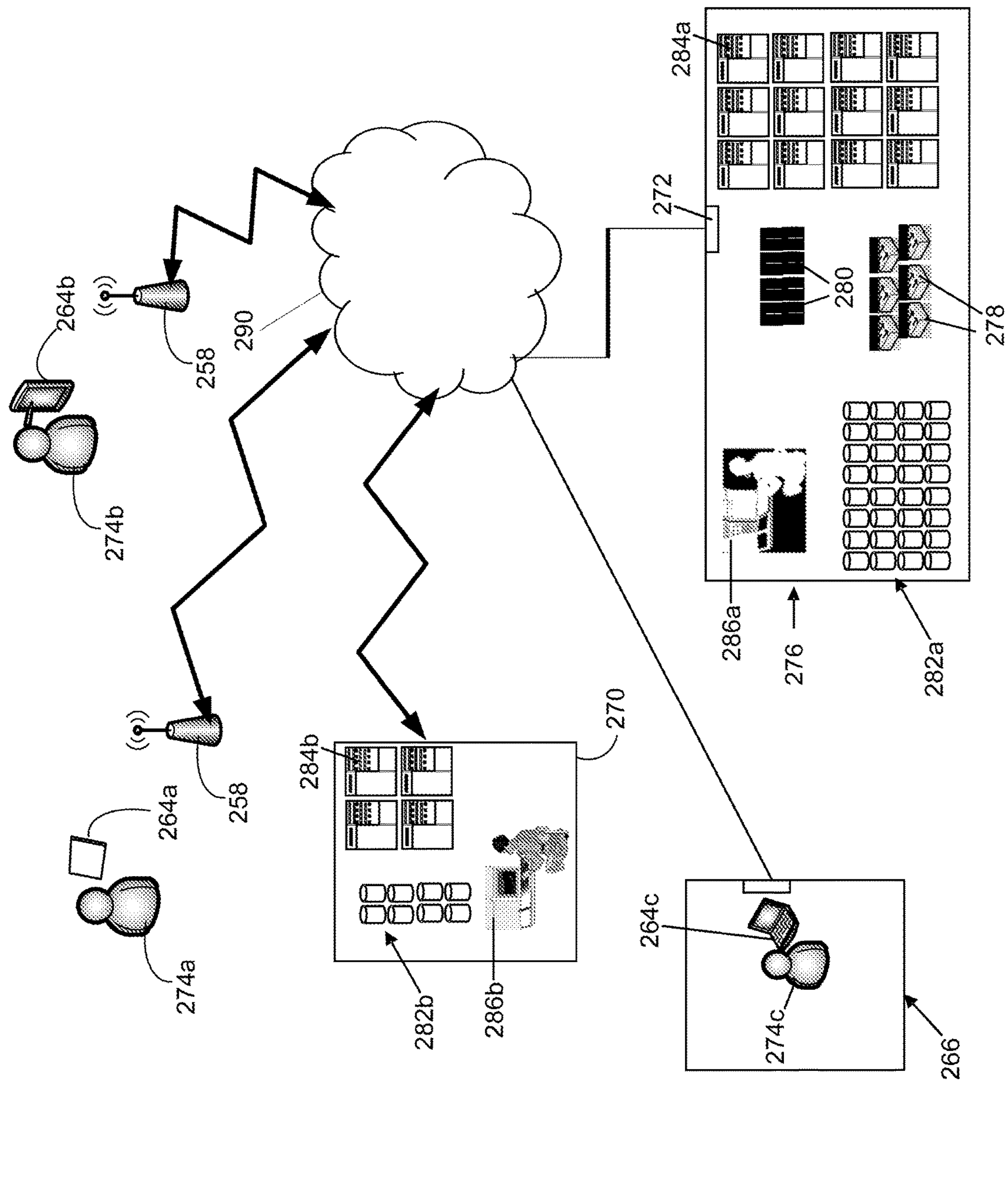
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 290. The networks 290 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 290. The gaming data center 276 is capable of communication with the networks 290 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 290. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 290. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
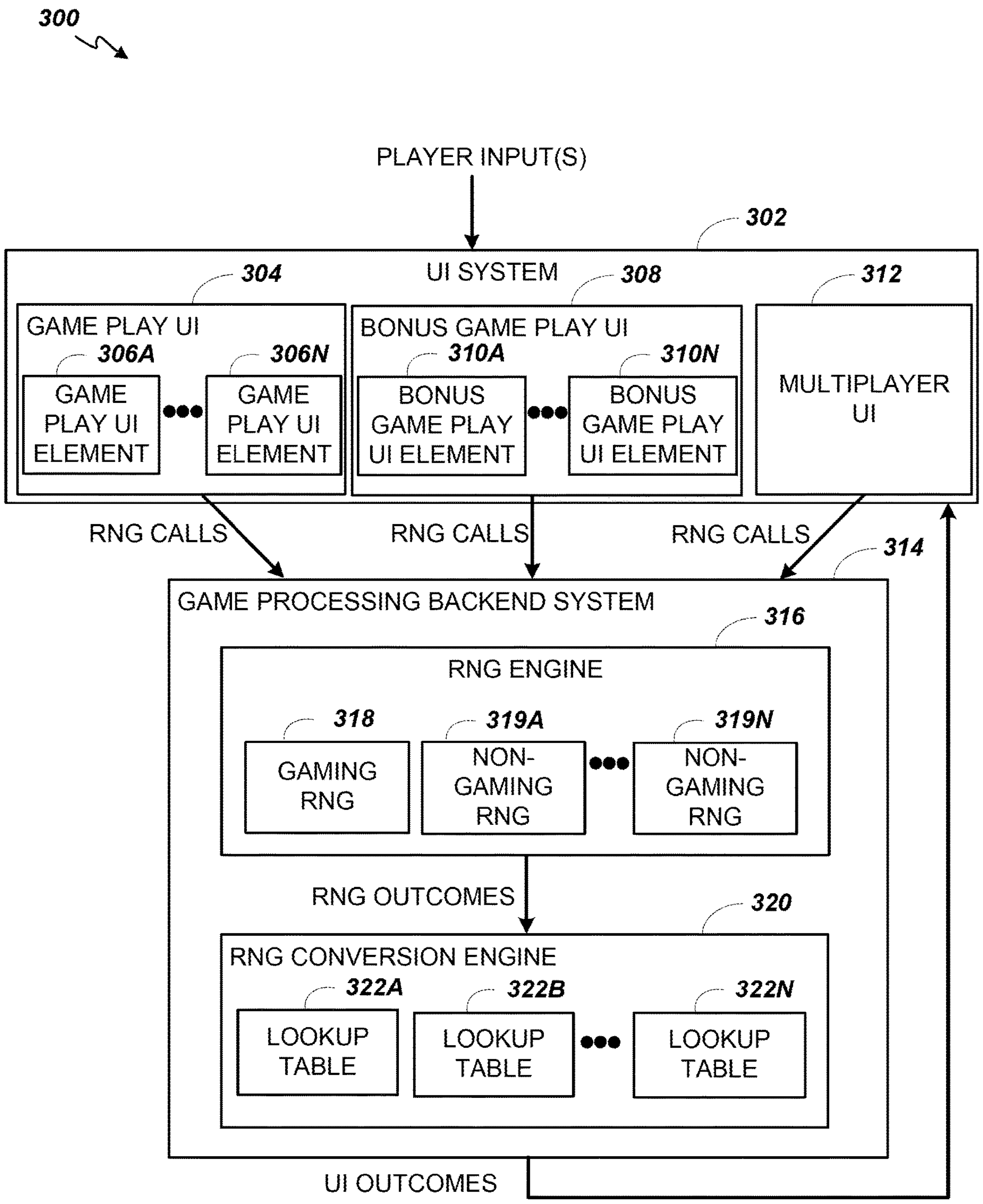
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
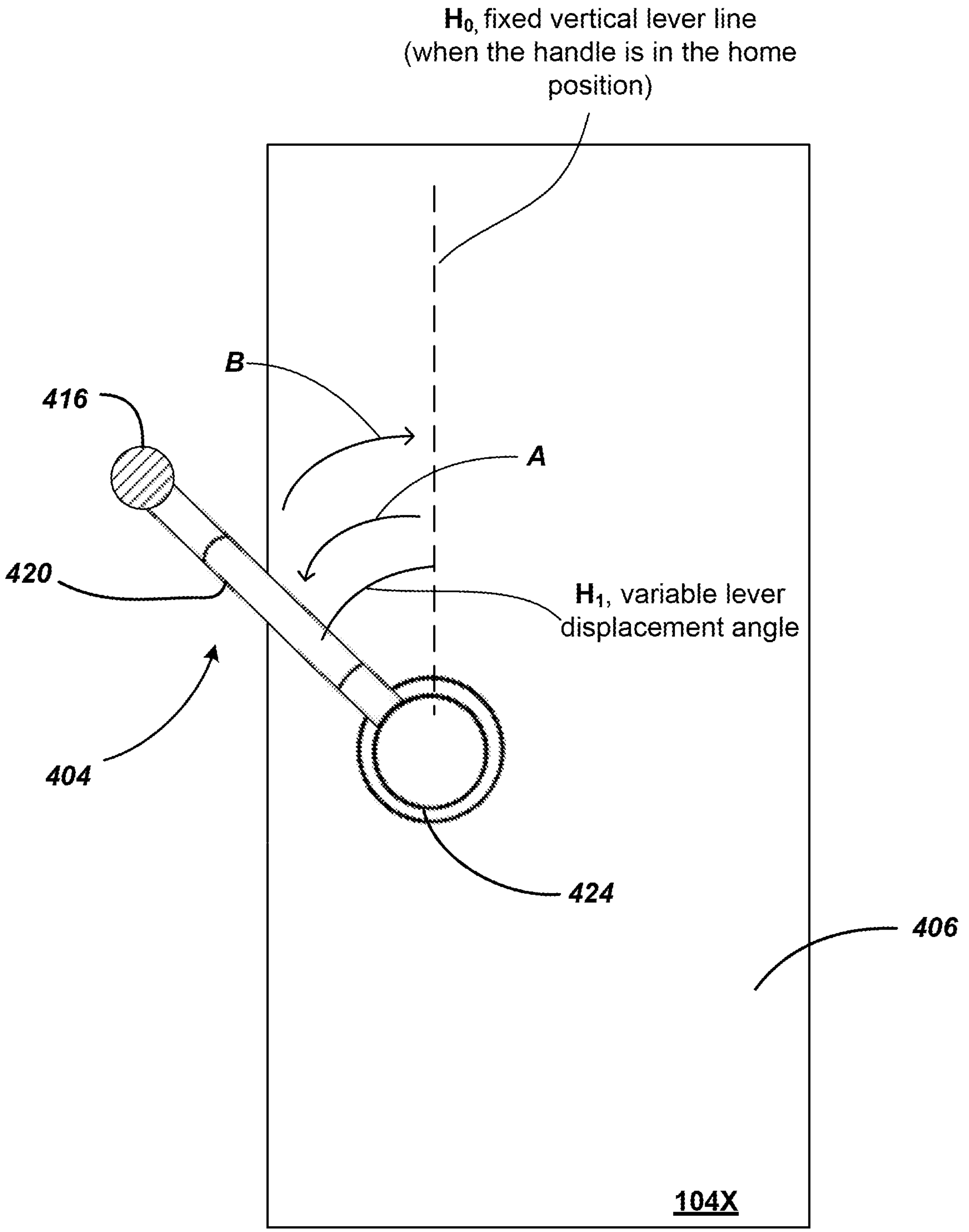
FIG. 4A illustrates a portion of a side view of a game device with an input device in accordance with various implementations described herein.

FIG. 4A illustrates a side view of gaming device 104X having an input device 404 removably connected at a cabinet 406. The input device 404 allows players to variably control one or more game elements, features and/or gaming operations. The input device 404 may be in the form of a handle, arm, or lever that moves along a single axis. Alternatively, the input device 404 may also be in the form of a variable position lever that has more than two degrees of movement, e.g., multi-axis movements, that permits movement in different directions on the same axis (multi-directional, single-axis movements), or different directions on different axes (multi-directional, multi-axis) to provide varied, multi-axis control input capability. The input device 404 may be configured to include haptic and/or audible feedback to the player, such as ratchet sounds.

As shown, the input device 404 includes a knob 416 connected to a handle shaft 420. The handle shaft 420 is attached to a back-driving handle assembly 424. The back-driving handle assembly 424 may include various physical connections that interconnect to electronic and mechanical systems or components of the gaming device or EGMs 104A-X. The back-driving handle assembly 424 may house, or connect to, components (detailed hereinafter), such as one or more decoders, USB translators, power sources, sensors, actuators, output devices and other mechanical or electrical systems or components, some of which are identified below, while others are omitted for clarity purposes.

In traditional arrangements, EGMs 104A-X may not detect slight movements or intermediate pull positions of the slot machine handle; rather, it only detects when the handle reaches a trigger position to initiate the game session (e.g., to spin the reels). That is, the traditional arrangement for a handle is to provide a home position and a second position away from the home position to initiate the game so as to prevent accidental game initiations at intermediate positions, e.g., when a partial pull of the handle is made.

The back-driving handle assembly 424 may be configured to detect intermediate positions or partial pulls, or may permit the forced return by the player or the input device 404 to the home position after a player initiated a gaming session. In some instances, the input device 404 may be released at a game initiation trigger point by the player of the input device 404, and allowed to make a controlled return to a start or home position without imparting additional force against the back-driving handle assembly 424, a face-plate 428, and/or a hub 432.

The input device 404 may also provide tactile or haptic feedback to the player. Such feedback may include, for example, physical sensations during gaming device operations. For example, the input device 404 may vibrate in response to game operations or a game element being positioned or reaching certain intermediate positions. The tactile or haptic feedback is contemplated to be natural and realistic in relation to that which may be experienced by the game play feature or element or in performing in a game machine activity. In certain implementations, additional motors or other actuators in the input device 404 may be included to communicate or convey physical sensations to the player in conjunction with other visual and auditory game play feedback that may be implemented.

Referring back to FIG. 4A, the input device 404 may be moved or rotated to a second position, or a second input position, through a variable lever displacement angle ($H_1$) due to a counterclockwise torque in a first direction (e.g., direction A). An applied or exerted force on the input device 404, for example, along direction A, moves the input device 404 from a fixed vertical lever line ($H_0$), a home position, i.e., a first position to a second position. The motion of the input device 404 may be detected or sensed by sensor units and may be communicated to one or more game controllers (e.g., 202 in FIG. 2A) via an input signal that is indicative of the motion, in response to a torque or force applied to the input device 404. In this example, as shown in FIG. 4A, the motion of the input device 404 may trigger or activate one or more functionalities of the EGM 104X on or before reaching the first position.

Under normal operations, when a force applied to the knob 416 or the shaft or handle 420 is released, the balancing force of a return torsion spring or a return spring 444 returns the input device 404 to the home position in a second direction 412 that is opposite to the first direction 408. However, under other circumstances, some players may desire to forcibly return the input device 404 to the home position in the second direction 412 with excessive external torques. Such external torques exceed the initial bias of the handle to return to the home position.

Figure 4B:
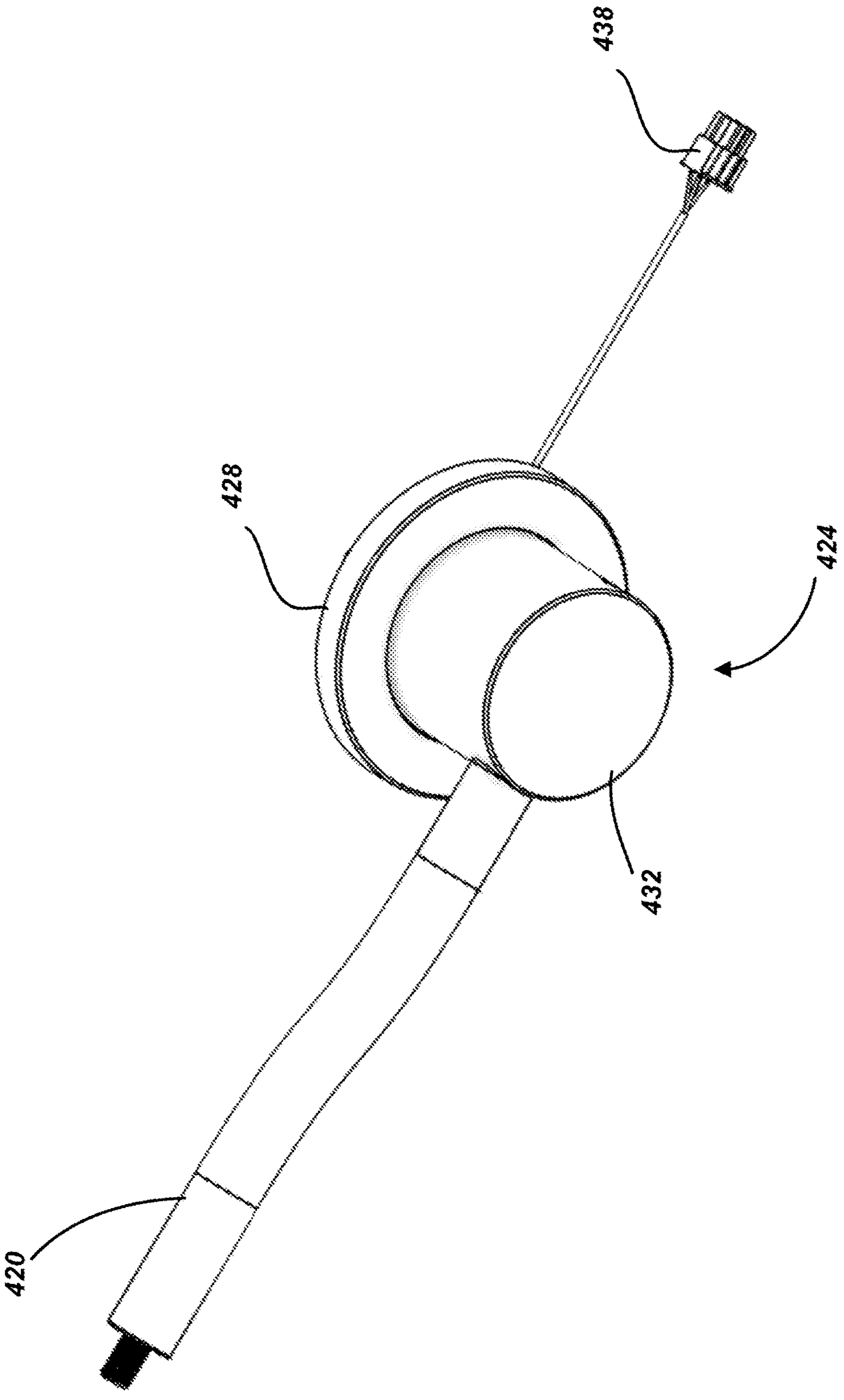
FIG. 4B illustrates a portion of an exemplary input device in FIG. 4A.
Figure 4C:
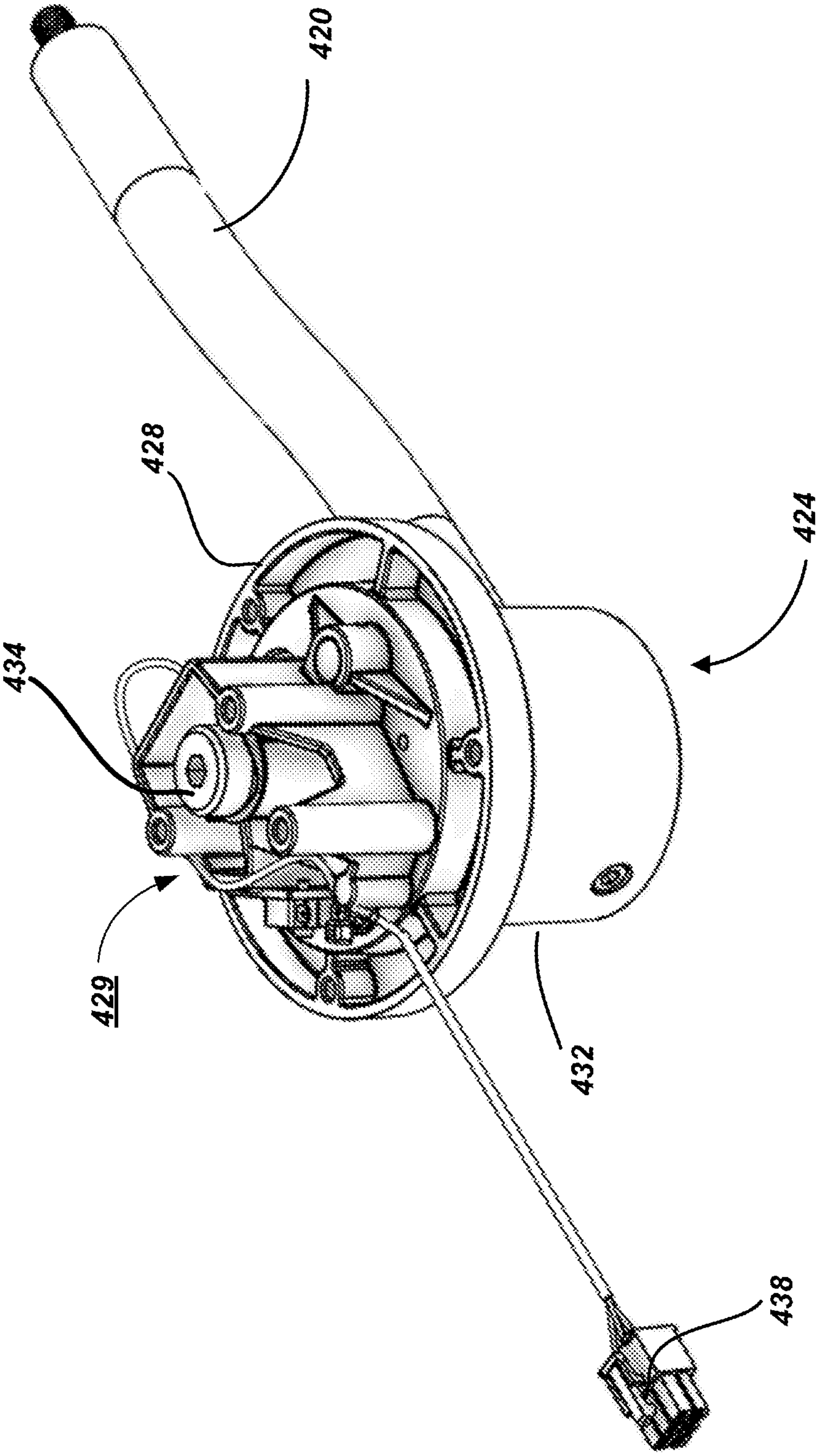
FIG. 4C illustrates a different view of an exemplary input device in FIG. 4A.

FIG. 4B illustrates a portion of the input device 404 in FIG. 4A, and FIG. 4C illustrates a different view of the input device 404 in FIG. 4A, wherein like numerals refer to like parts, and wherein some parts are removed for clarity purposes. As shown, the input device 404 may comprise a face plate 428 removably connected to the cabinet 406, and is rotatably attached to a hub 432 with a shoulder screw 434. That is, the hub 432 along with the handle shaft 420 may be configured to rotate about the face plate 428 when a torque is applied in: (1) the first direction A (a counterclockwise direction) or (2) the second or reverse direction B (a clockwise direction), as shown in FIG. 4A.

The input device 404 may be electrically connected to one or more game controllers 202 housed in the EGMs 104A-X or other device by an input/output component 438 to transmit, communicate or generate signals or data to transmit or send data indicative of, e.g., the position, direction and/or velocity information of the handle shaft 420. In some examples, the component 438 may include a plurality of serial connectors. A non-transitory signal may be communicated or transmitted to the game controller 202 or other device via the component 438 in communication with one or more other components of the input device 404. The non-transitory signal may be absolute, relative, or incremental.

Although not shown, the component 438 may be connected to one or more sensors or encoders housed in the back-driving handle assembly 424 that may provide the signal to EGM 104X or gaming device via the output component 438. In some examples, component 438 may be connected to a pair of sensors. The sensors employed may be mechanical, magnetic (e.g., on-axis or off-axis), optical, or laser, for example, depending on the gaming environment used. Employing sensors having an absolute output signal may provide information to the game controller 202 to communicate or transmit data indicative of the position of the input device 404, e.g., the position of the handle shaft 420 rotated between the second position, or other intermediate position, and the home position. Such sensors may also be referred to as angle transducers. Depending on the gaming environment, an absolute sensor or encoder may have a benefit of maintaining position information even with a power outage at the gaming establishment (e.g., a casino or bar).

Similarly, employing a sensor that has a relative output signal may provide information to the game controller 202 to transmit or communicate data indicative of the position of the input device 404, e.g., the position of the handle shaft 420 rotated between the input device 404 and the home position. Employing sensors having an incremental output signal may provide precise information to the game controller 202 concerning position, velocity, and direction of the input device 404, which may provide real-time information and higher degree of measurement resolution for the movement of the input device 404. However, if the absolute position is to be tracked with an incremental sensor, a bidirectional electronic counter or similar device can be used. Regardless of the sensor type deployed, sensors provide enhanced monitoring and/or control of game features, elements and/or operations by the player or players throughout the movement or positions of the input device 404.

Additionally, the input device 404 may have multiple states being monitored along a movement path. For example, some of those states may include position, direction, and velocity of the input device 404. The states may, for example, include: the first position; the second position; various intermediate positions in between the first position and the second position; various movements; actuated trigger positions; and/or a game initiation or spin positions. One or more of these states may change as the input device 404 moves from one position to another position, at a first velocity to a second velocity along a movement direction, or from a first direction to a second direction, for example. The input device 404 may be dynamically reconfigured to change from and to one or more states and/or one or more triggers. The input device 404 may be coupled to a main cabinet or gaming cabinet 116. The input device 404 may be positioned in a number of locations depending on the features employed. The input device 404 may be to player's right side or left side when facing the gaming device(s) 104A-X as is typical with some gaming device handles.

Figure 4D:
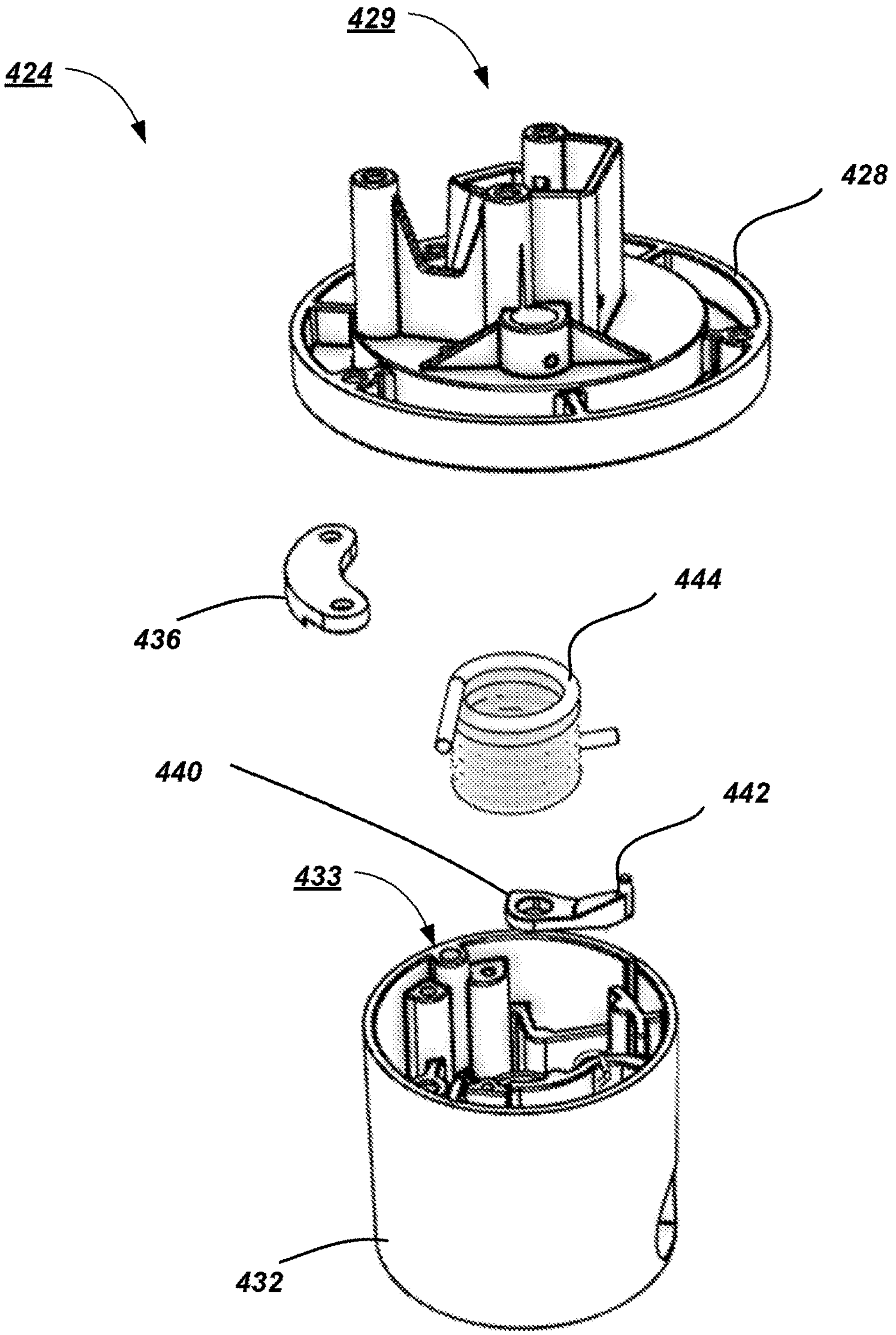
FIG. 4D illustrates an exploded view of an exemplary back-driving handle assembly of the input device in FIG. 4B.

FIG. 4D illustrates an exploded view of a portion of an exemplary back-driving handle assembly 424 in FIG. 4B, wherein like numerals refer to like parts, and wherein some parts are removed for clarity purposes. As shown, the illustrated back-driving handle assembly 424 includes a ratchet, or a ratchet plate 436. In some examples, the ratchet plate 436 is fixed to the face plate 428 and may be configured to receive at least a portion of a pawl handle, or a pawl 440. In some embodiments, the illustrated back-driving handle assembly 424 also includes a first pillar protruding structure 429 that resides on a surface of the face plate 428, and may be received and secured in a corresponding receiving structure (not shown) in the gaming cabinet 116. As shown, the first pillar protruding structure 429 includes a number of pillars that are spaced apart. The illustrated back-driving handle assembly 424 also includes a second pillar protruding structure 433 that resides in the hub 432 for receiving and securing the pawl 440 and a bumper (similar to bumper plate 610 of FIG. 6A). As shown, the second pillar protruding structure 433 includes a number of pillars that are spaced apart. The pawl 440 may be rotatably attached to the hub 432 at the second pillar protruding structure 433. A reaction pin or pin 442 protrudes from the pawl 440, and is configured to escape, glide, move, slip, roll, rotate, or slide within the ratchet plate 436. The return spring 444 may be secured at a spring receiving structure (similar to spring receiving structure 603 of FIG. 6A), and may be arranged to bias the back-driving handle assembly 424 to a home position, e.g., after the back-driving handle assembly 424 is turned or rotated in the first direction A and released.

Figure 5A:
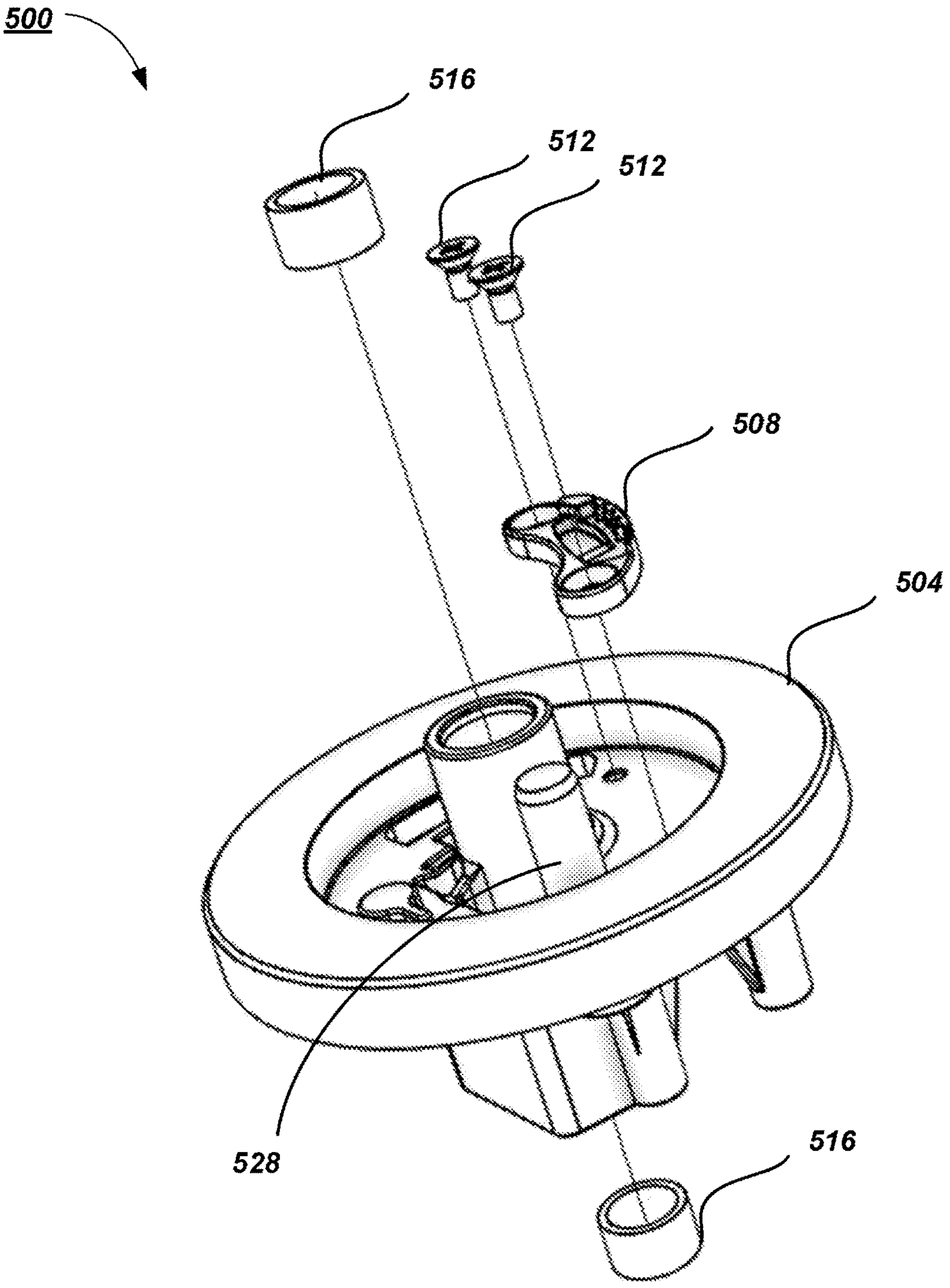
FIG. 5A illustrates an exploded view of an exemplary face plate assembly.
Figure 5B:
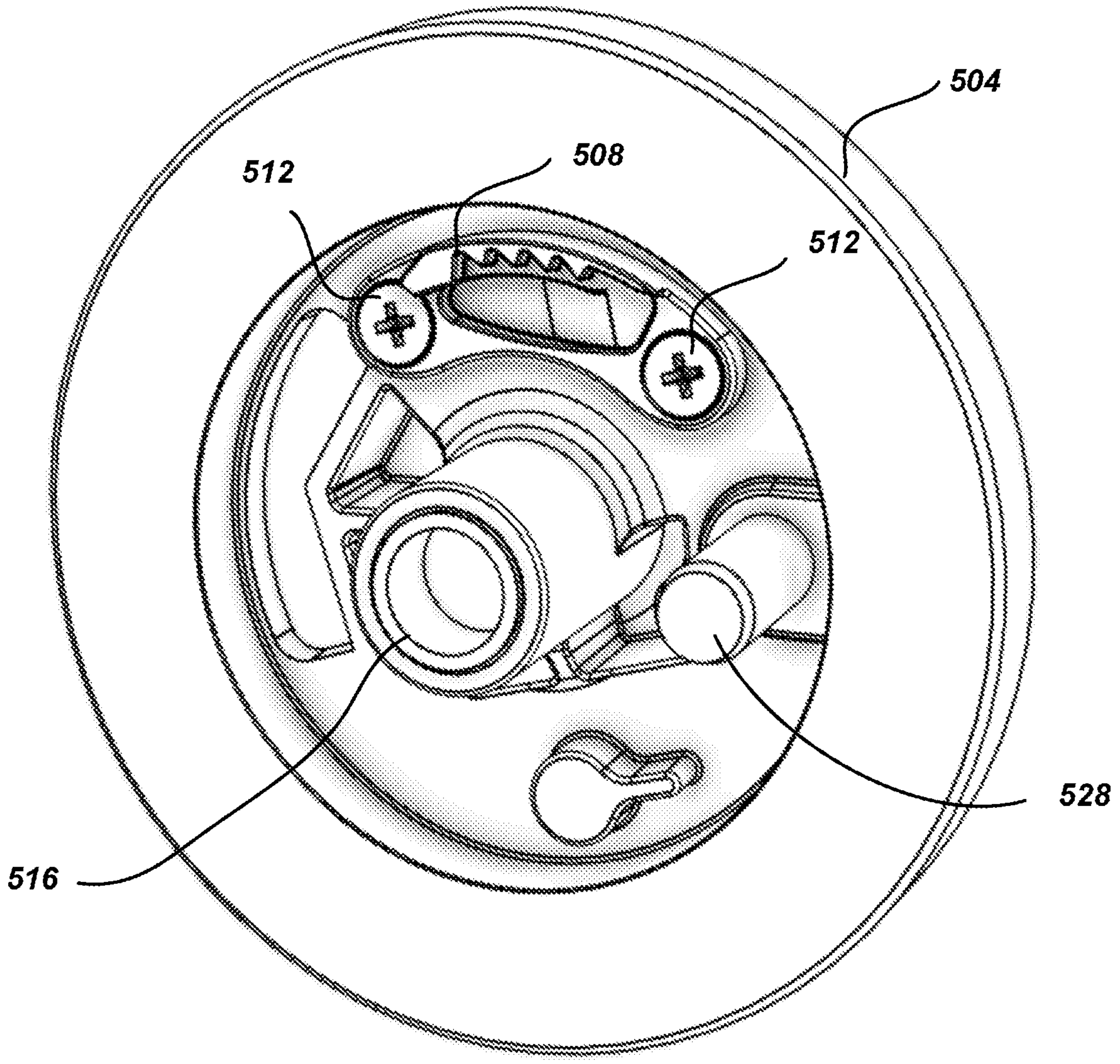
FIG. 5B illustrates a perspective view of an exemplary face plate assembly with a ratchet plate.
Figure 5C:
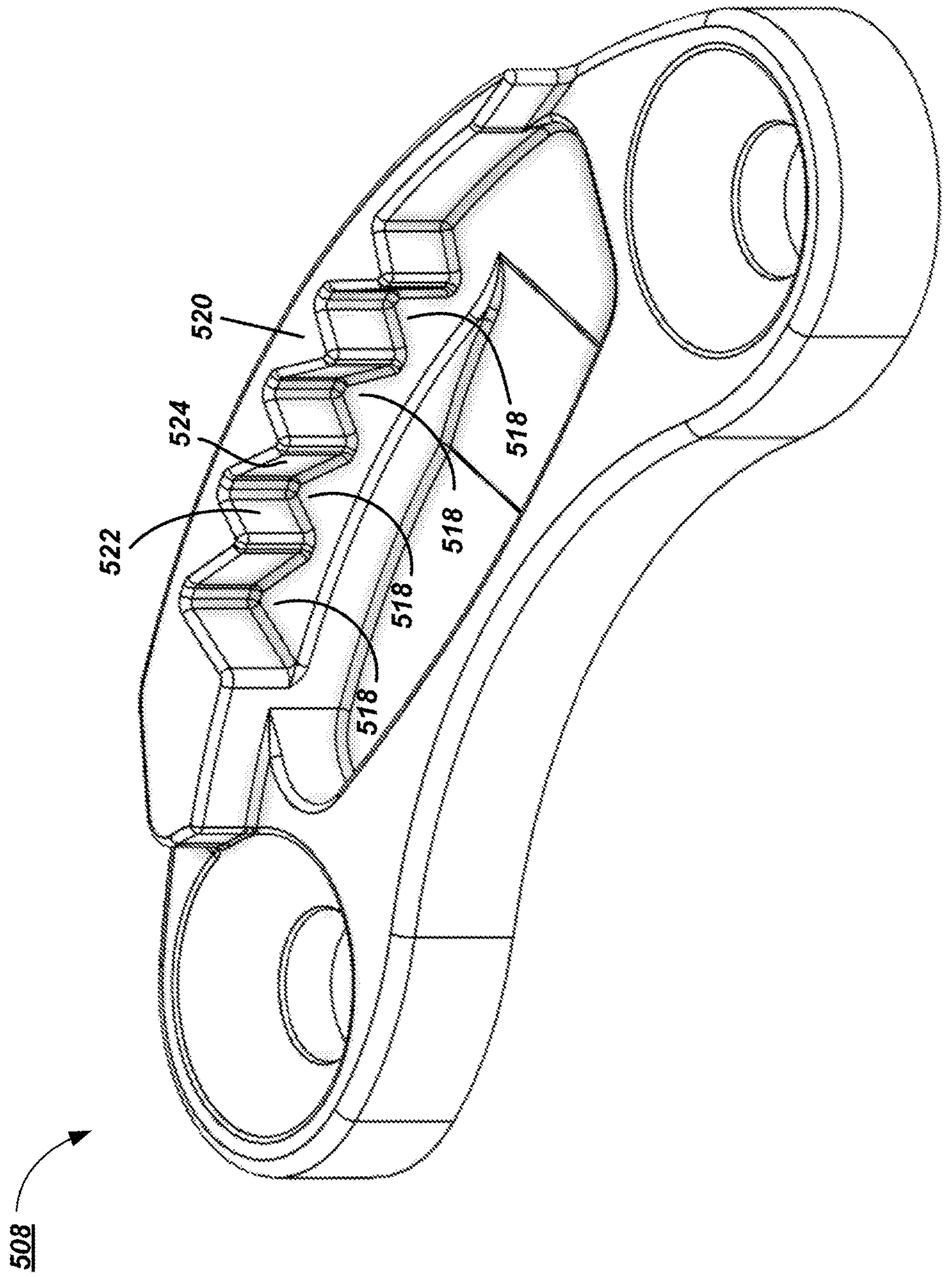
FIG. 5C illustrates a ratchet plate showing an exemplary plurality of angled teeth.

FIG. 5A illustrates an exploded view of an exemplary face plate assembly 500, which includes a face plate 504, which is similar to the face plate 428 of FIG. 4B. FIG. 5B illustrates a perspective view of the exemplary face plate assembly 500 with a ratchet plate 508, which is similar to the ratchet plate 436 of FIG. 4D. Additionally, the components in FIG. 5A are assembled together to yield face plate assembly 500 in an assembled state. FIG. 5C illustrates a perspective view of an exemplary ratchet plate 508.

As shown in FIGS. 5A-5C, the exemplary ratchet plate 508 is secured to the face plate 504 with a pair of screws 512. In some examples, the screws 512 may include M4x8 C-sunk head screws. In other examples, the ratchet plate 508 may be integral to or physically integrated into the face plate 504. The face plate assembly 500 also includes a plurality of bushing sleeves 516 for receiving a center shoulder bolt (similar to the shoulder bolt 434 of FIG. 4C) to rotatably attach the hub 432 (in FIG. 4D) to the face plate assembly 500. The arrangement of the bushing sleeves 516 minimizes introduction of frictional forces from the rotation of handle assembly 424, which, in turn, facilitates a smoother rotation of the handle assembly 424 during operation. The face plate assembly 500 also includes a dowel 528 that may be integral to or physically integrated into the face plate 504. In some examples, the return spring 444 (in FIG. 4D) abuts against the dowel 528. In other examples, the dowel 528 may be attached to the return spring 444 (in FIG. 4D). The dowel 528 may rotate and interact with one or more dampers.

As illustrated in FIG. 5C, the ratchet plate 508, as shown, includes a plurality of angled teeth 520. The plurality of angled teeth 520 sandwich a plurality of valleys or dips 518, respectively. Each of the angled teeth includes a first side 522 and a second side 524. In some examples, the first side 522 has a first angle or first slope that may be determined or measured as its angle of contact with the reaction pin 442 (in FIG. 4D), and, the second side 524 has a second angle or second slope that may be similarly determined or measured as a contact angle. In some examples, the second slope is different from the first slope. In some examples, the first slope is larger than the second slope. In other examples, the first slope is steeper than the second slope, e.g., a first slope may be about 36°, and the second slope may be about 100°. A greater contact angle for the second slope leads to a lower likelihood of locking up of the handle assembly 424, when a reverse loading is placed on the handle assembly 424 (e.g., direction B) depending on the countering acting forces from the return spring 444 and the torsion spring 604.

In still other examples, the first side 522 and the second side 524 may have convex and concave sides. Additionally, the relative length of the sides 522, 524 and the space between the sides 522, 524, which create the valleys 518, may be varied depending on the expected loading conditions and desired audible clicks.

By providing suitable slopes and lengths of the sides 522, 524 of the angle teeth 520, the balancing of forces, including friction forces and counteracting spring forces, allow the pin 442 to move, in either forward or reverse operation, over sides 522, 524 for example, and into the valley 518. Additionally, the slopes of the sides 522, 524 of the angled teeth 520 are configured to facilitate a normal, clicking sound during operation, which provides feedback to the user. The lack of or a diminished clicking sound also serves to confirm that the ratchet plate 508 has a degree of damage, even if it remains operational.

Although the exemplary ratchet plate 508 is shown to include four angled teeth, more or less angled teeth may be configured for the ratchet plate 508. Further, although the plurality of angled teeth 520 are generally shown to be uniform, each of the plurality of angled teeth 520 may be individually sized and shaped to specific design requirements. In some examples, the ratchet plate 508 is formed from 17-4 PH stainless steel powdered metal that is heat treated to 30-38 HRC. In other examples, the ratchet plate 508 may consist of other alloy or materials providing suitable material properties for the loadings on the ratchet plate and related parts or components.

Figure 6A:
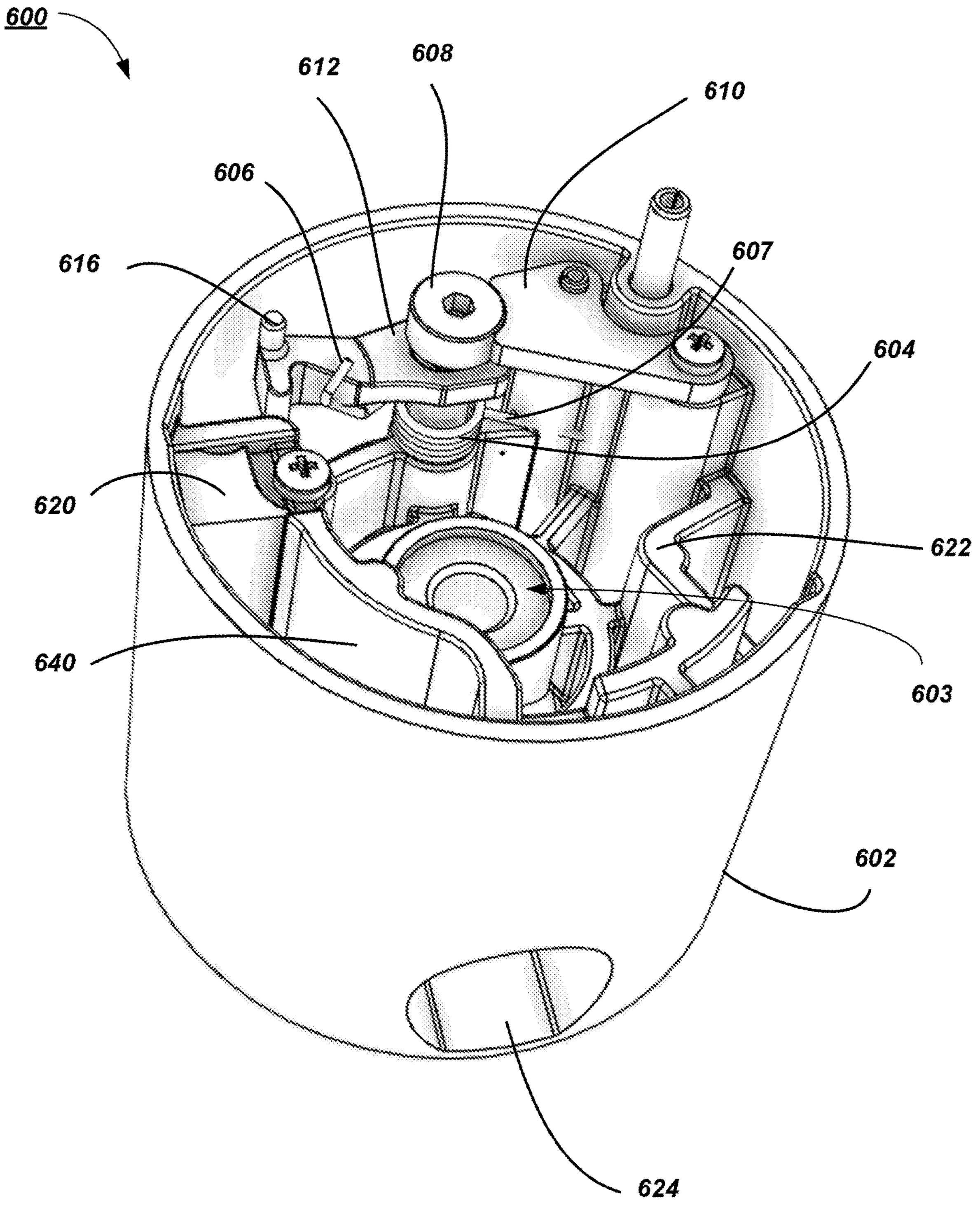
FIG. 6A illustrates a partial view of an exemplary hub assembly with a pawl and a torsion spring.
Figure 6B:
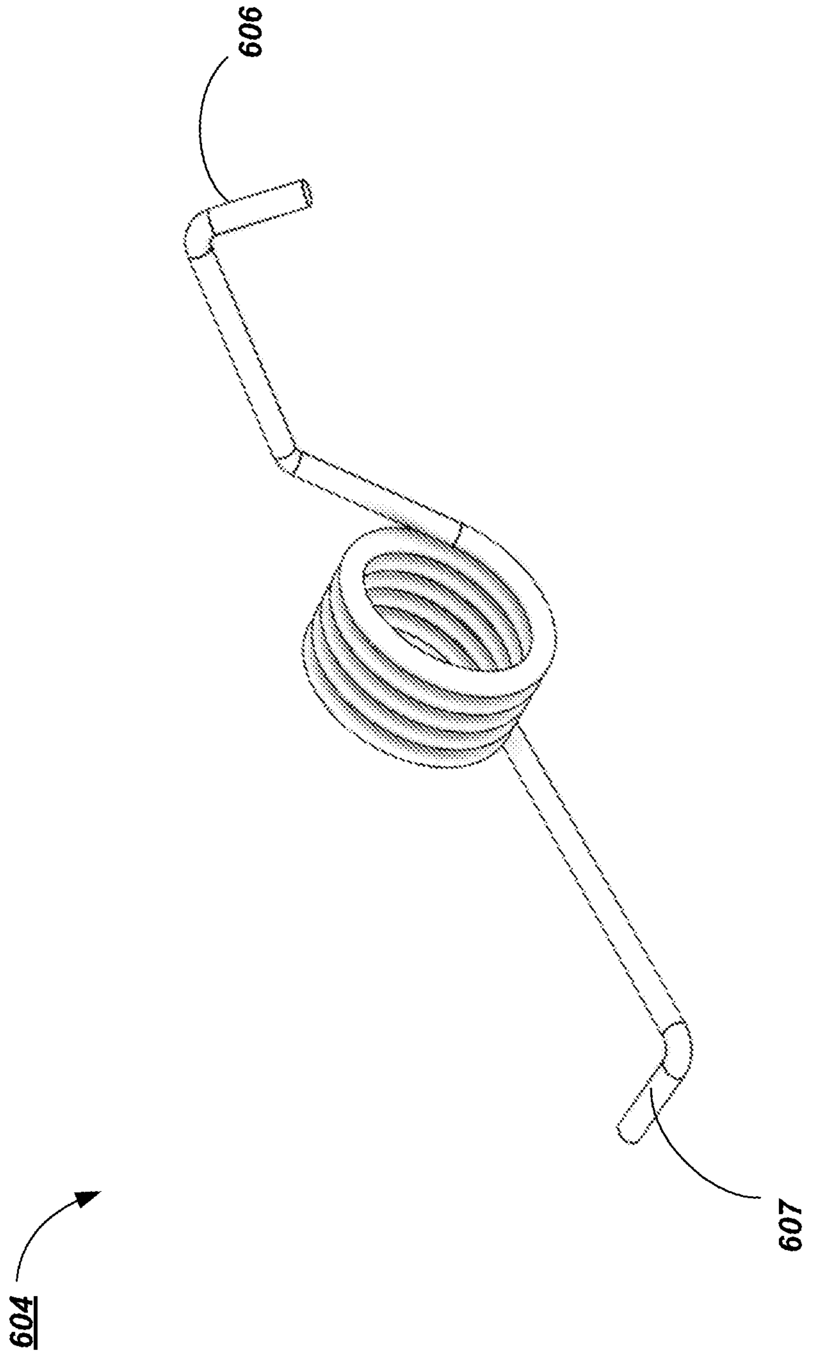
FIG. 6B illustrates an exemplary torsion spring.
Figure 6C:
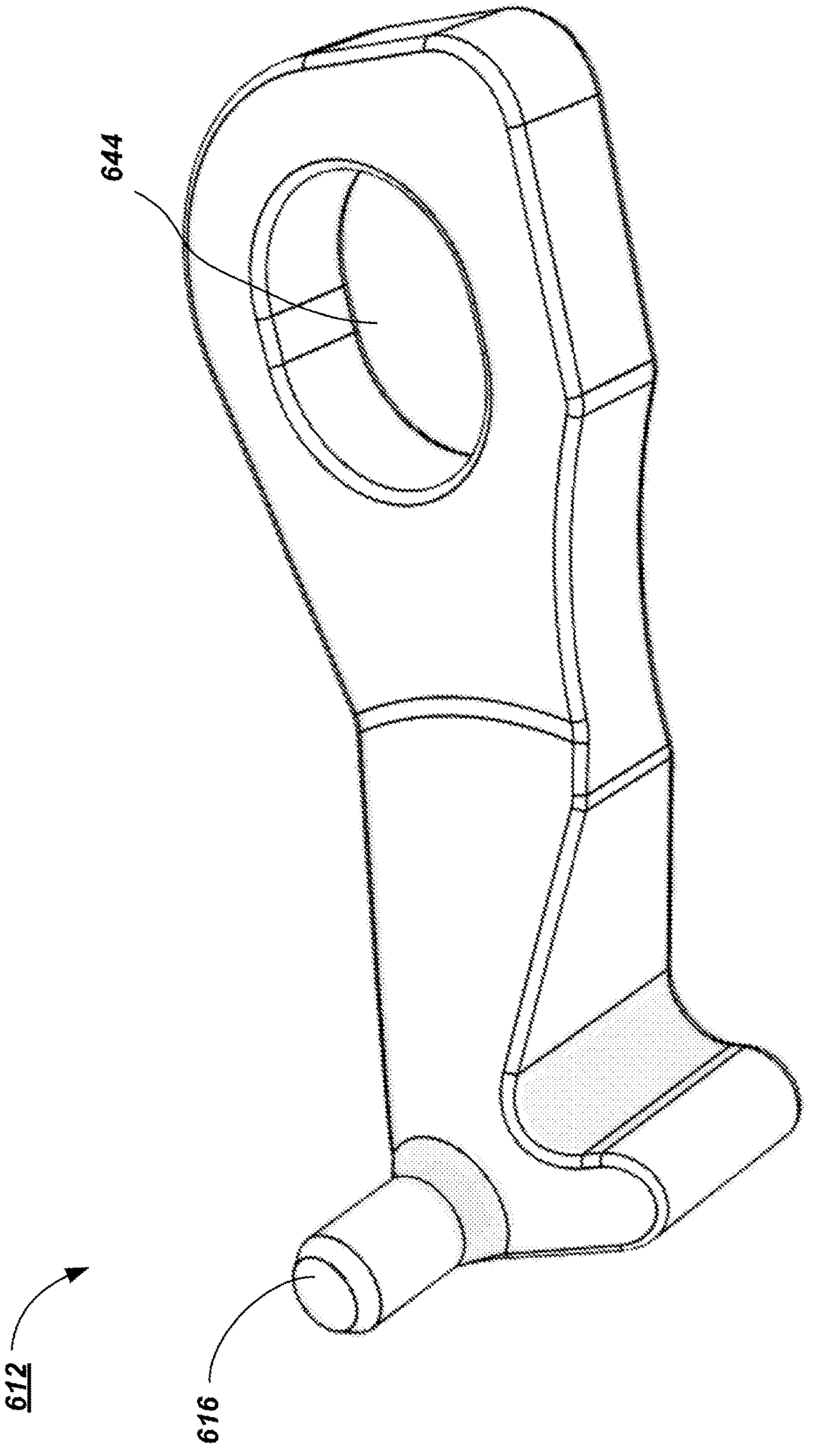
FIG. 6C illustrates an exemplary pawl having a reaction pin.
Figure 6D:
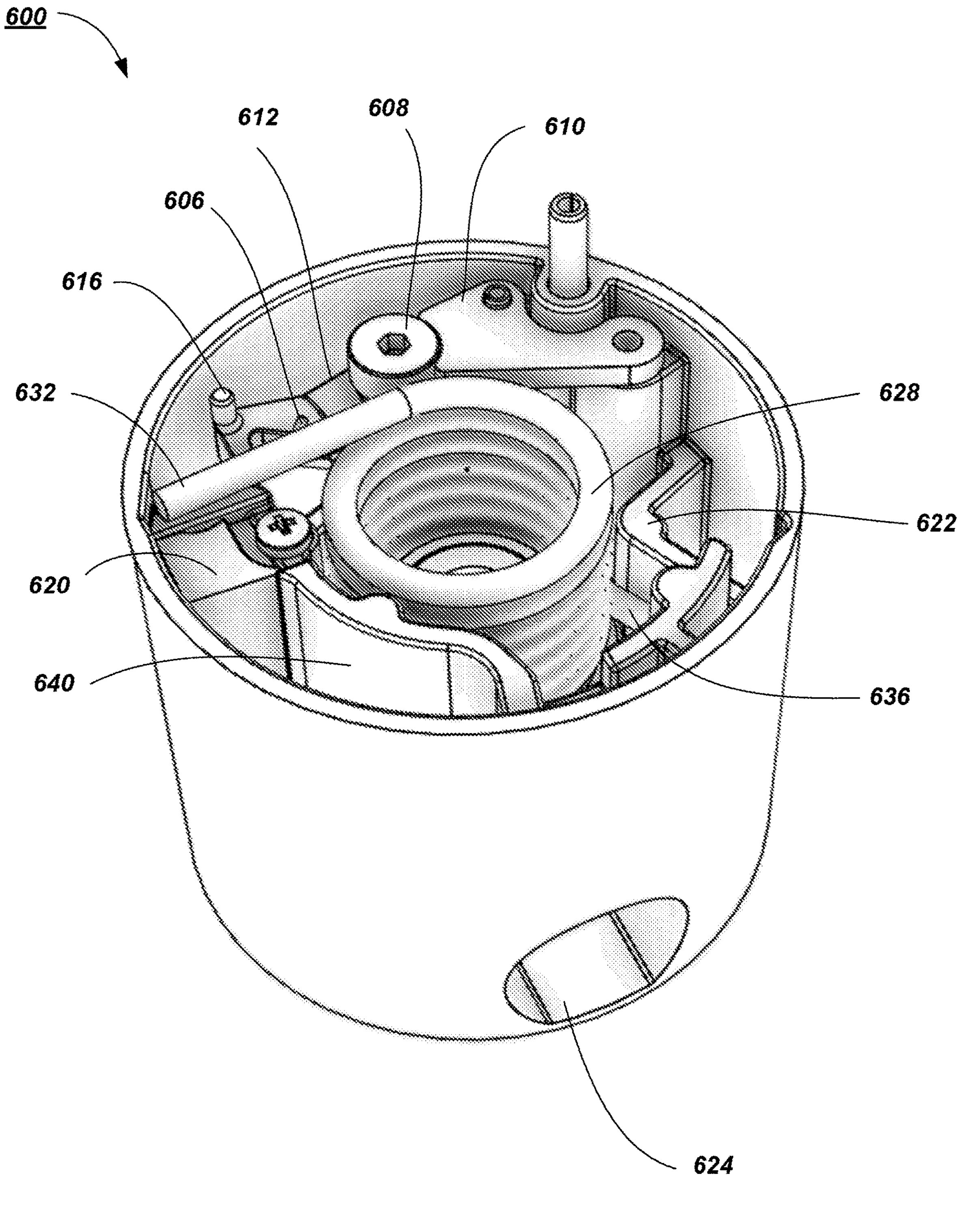
FIG. 6D illustrates a partial view of an exemplary hub assembly with a return spring.
Figure 6E:
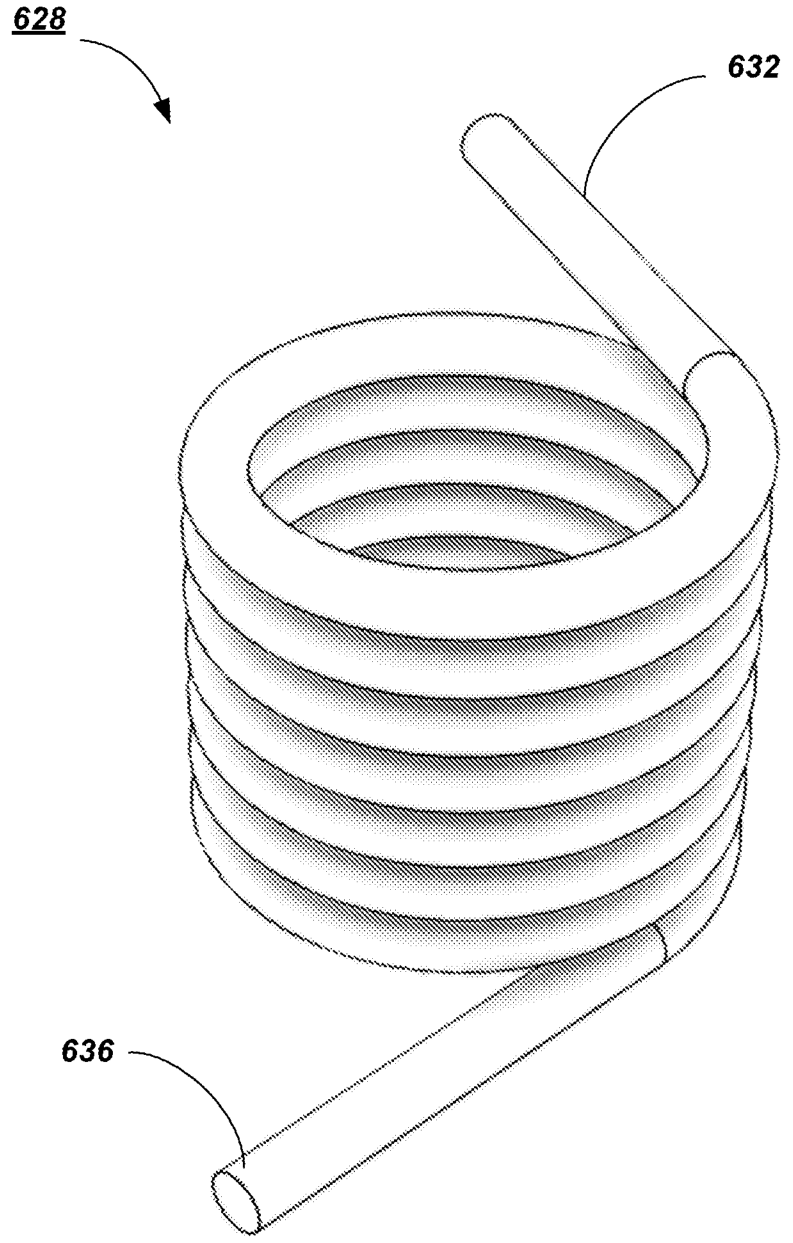
FIG. 6E illustrates an exemplary return spring.

FIG. 6A illustrates a partial view of an exemplary hub assembly 600, comprising a hub 602, which is similar to the hub 432 of FIG. 4B, and a pawl 612 residing above a torsion spring 604 (different from the return spring 444). FIG. 6B illustrates an exemplary torsion spring 604. FIG. 6C illustrates an exemplary pawl having a reaction pin. FIG. 6D illustrates a partial view of an exemplary hub assembly 600, comprising a hub 602, which is similar to the hub 432 of FIG. 4B, and a return spring 628. FIG. 6E illustrates an exemplary return spring. Like numerals in FIGS. 6A-6E refer to like parts, wherein some parts may be removed for clarity purposes.

As illustrated in FIGS. 6A, the pawl 612 and the torsion or pawl spring 604 are rotatably secured to the hub 602 with a shoulder bolt 608 and a reaction hole 630 (not shown) that is formed in or defined by the hub 602. In some examples, the pawl 612 is configured to be rotatable about the shoulder screw or bolt 608, which provides a center of pawl rotation.

The pawl 612 also includes a protrusion in the form of a pawl pin 616. The pawl spring 604, as illustrated in FIG. 6B, includes a first spring leg 606 and a second spring leg 607. The first spring leg 606 biases or pushes against the pawl 612 outwardly towards the tangent of the hub 602, or an angle of contact with the pin 616, such that when the reaction pin 616 is pinned against the angled teeth 520, the pin 616 substantially stays in contact with the angled teeth 520. The length of the first spring leg 606 should be selected to avoid interference with the actions of the reaction pin 616. The second leg 607 of the pawl spring 604 is attached to the reaction hole 630, counteracts rotation of the return spring 628, and secures the pawl spring 60 to the hub 602. The length of the second spring leg 607 should be selected to ensure that the pawl spring 604 is suitably secured to the hub 602. The torsion spring 604, as illustrated in FIG. 6B, may have an upward bend 606, as shown, that helps facilitate movement in the normal direction so that the pawl 612 can move back freely with no angled teeth 520 engagement after the handle shaft 420 has finished its complete stroke. Such an upward bend 606 may allow the handle shaft 420 to return from a normal stroke without making any clicking sounds. This movement without clicking may be further enhanced by shaping the through-hole 644 in an oval shape, which is discussed further below.

In some examples, the ratchet plate 508 functions to provide friction and moments via the plurality of angled teeth 520, and counteracts movements of the pawl 440 and the pin 442 (of FIG. 4D), which respond to torques exerted or applied at the handle shaft 420. For example, when the handle shaft 420 travels or moves in the first direction 408 from the home position (as shown in FIG. 4A) responsive to a downward force exerted at the handle shaft 420, or in the second direction 412 toward the home position responsive to an upward force, the pin 442 rides along the angled teeth 520 and typically stops at one of the valleys or dips 518 by contacting the first side 520 or the second side 524.

The hub assembly 600 also includes a bumper plate 610, as illustrated in FIG. 6A, configured to lean against the shoulder bolt 608 and prevent the shoulder bolt 608 from being bent or dislodged from the pawl 612 when force is applied to some portion of the input device or handle assembly 404. In some examples, the pawl 612 is formed from 17-4 PH stainless steel powdered metal that is heat treated to 30-38 HRC. In other examples, the pawl 612 may consist of other alloy or materials providing suitable material properties for the loadings experienced by the pawl 612 and related parts or components, e.g., the reaction pin 616.

The handle shaft 420, illustrated in FIG. 4A, may be inserted into receptacle 624 and secured during assembly. The handle shaft 420 is shown as straight, but the handle shaft 420 may take various ergonomic shapes and sizes. In the example shown, at least a portion of the handle shaft 420 to be inserted and secured in the receptacle 624 that has a D-shaped cross-section. The cross-section of the receptacle 624 can be sized and shaped to prevent rotation of the handle shaft 420 within the receptacle 624. As shown, the hub assembly 600 also includes a second bumper 620 to provide a stop for the dowel 528, illustrated in FIG. 5A, traveling in channel 640.

Turning to FIG. 6E, FIG. 6E similarly illustrates an exemplary return spring 628 having a first arm 632 and a second arm 636 leaning against a restraining wall 622, as shown in FIG. 6D. The restraining wall 622 may take one of many forms to restrain the second arm 636, e.g., an integral wall, seat, or other protrusion.

The torsion or pawl spring 604 and return spring 628 are selected to counteract each other such that the return spring 628 is biased to return the hub assembly 600 to the home position. The return spring 628 in some examples is selected to have a weaker return force when the handle shaft 420 is near the home position and a stronger return force when the handle shaft 420 is at the largest displacement angle contemplated from the home position. The torsion spring 604 is biased to force the pawl 612 to contact the sides 522 and 524 of the angled teeth 520, which is a force opposed to the friction forces between the pin 616 and the sides 522 and 524 of the angled teeth 520 and to the spring forces having a return bias or an initial bias toward returning the input device or handle assembly 404 to the home position.

In some examples, the return spring 628 and the torsion spring 604 are selected based on at least one of several different factors such as torques, angles of pawl, locations of pawl, materials used, number of turns, and wire diameters. The radial distance of the torsion spring 604 from the center of the handle or hub assembly 424 may also factor into the choice of the return spring 628 and the torsion spring 604, which may influence the force tuning response for handle protection from reverse loadings. Other devices and arrangements that can store energy similar to a spring or coils in response to rotational forces are contemplated for the torsion spring 604 and the return spring 628. Counteracting magnets and similar arrangements are contemplated.

As shown in FIG. 6C, the pawl 612 includes a through-hole 644 for receiving the shoulder bolt 608 to rotatably attach the pawl 612 to the hub assembly 600. The pin 616 has a shape and length that suitably fits between the angled teeth 520 and into the dips 518. While shown in round cross section, the pin 616 can take various shapes and sizes, including various textures depending on the application. The through-hole 644, with the shoulder screw 608 installed, provides space for the pawl 612 to smoothly move thereabout. The through hole 644 may be shaped as an oval as shown in FIG. 6C. Other shapes of through-hole 644 are contemplated that allow the pin 616 to move in the normal direction so that the pawl 612 can move back freely with no angled teeth 520 engagement after the handle shaft 420 has finished its complete stroke. In this way, when an excessive torque is applied at the handle shaft 420 in the second direction 412, the configuration of the pawl 612 and ratchet plate 508, in view of the torques generated by the torsion spring 604 (of FIG. 6A) and the return spring 628 (of FIG. 6D), enable the pin 616 to travel back to the first position from the second position, with little or no damage to the angled teeth 520, other parts of components of the input device or handle assembly 404, or the game device.

Figure 7:
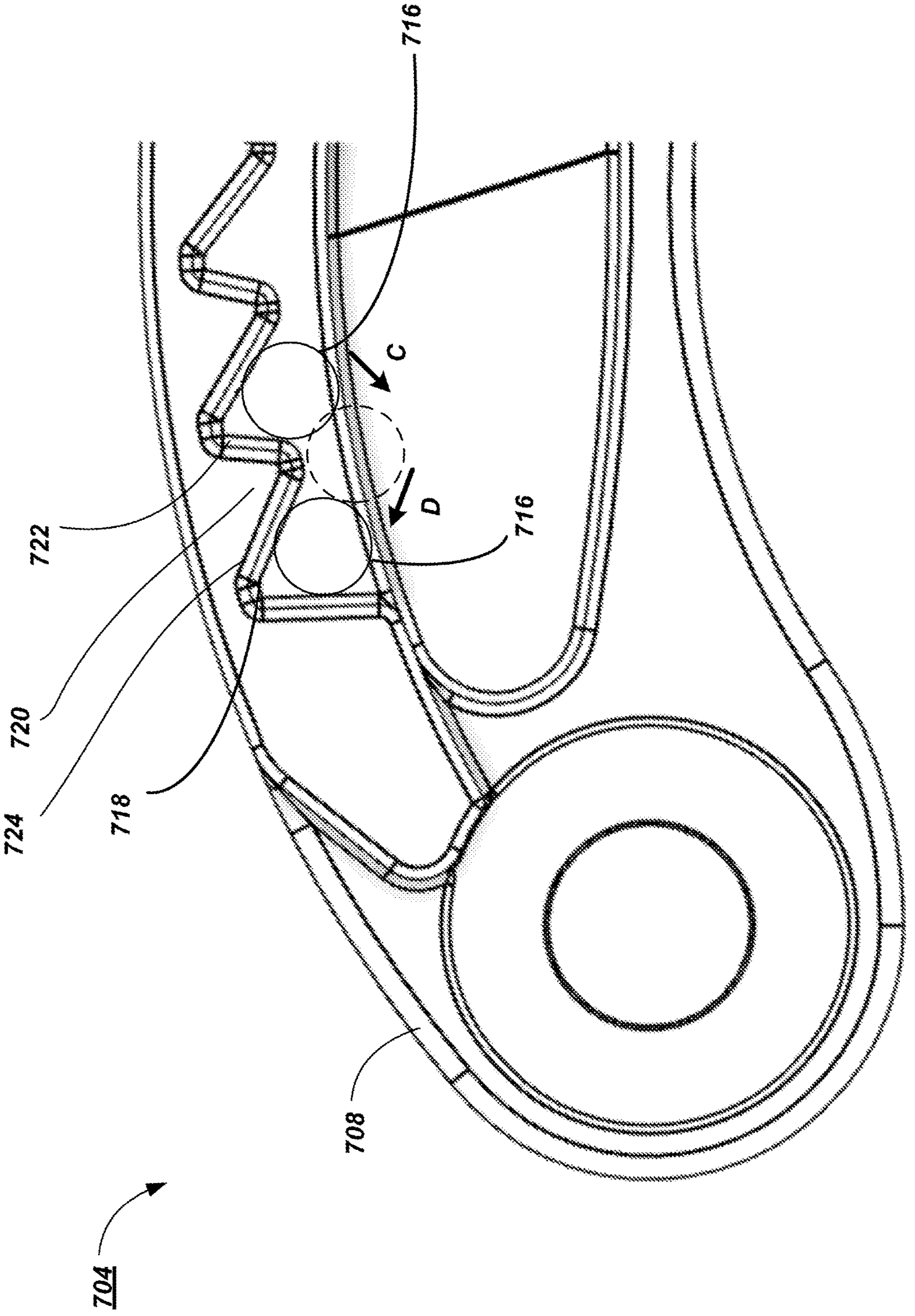
FIG. 7 illustrates an exemplary normal operation of a back-driving handle assembly.

FIG. 7 illustrates an exemplary, partial forward operation of a back-driving handle assembly 704 when the handle shaft 420 (of FIG. 4A) is moved in the forward or first direction A and a reaction pin 716 (similar to the pin 616) moves along a plurality of angled teeth 720 (similar to the angled teeth 520) on a ratchet plate 708 (similar to the ratchet plate 508). Like numerals refer to like parts, wherein some parts are removed for clarity purposes.

As illustrated in FIG. 7, the handle assembly 424 (of FIG. 4A) rotates in the first direction 408, responsive to a torque applied to the handle shaft 420 (of FIG. 4A). As discussed above, the plurality of angled teeth 720 on the ratchet plate 708 are fixed with respect to a cabinet 406 (of FIG. 4A), and as the hub assembly 600 (of FIG. 6A) and thus pawl 612 and pin 616 (of FIG. 6A), which engages the torsion spring 604 (of FIG. 6A), are being moved along a first path, C, with respect to a center of pawl rotation, reaction pin 716 reacts to the torque applied by the user at the handle shaft 420 and the torque generated by the torsion spring 604 (of FIG. 6A) and the return spring 628 (of FIG. 6D). As a result, the torque at the handle shaft 420 exceeds counteracting forces generated by the handle assembly 424, the reaction pin 716 escape, glide, move, slip, roll, rotate, or slide over a first side 722 of angled tooth 720 along path C to path D, to a second side 724 of angled tooth 720. During the slide, the reaction pin 716 is forced by the torque generated between the torsion spring 604 and the return spring 628 to substantially maintain contact with the angled teeth 720. After the reaction pin 716 has escaped, glided, moved, slipped, rolled, rotated, or slid over the angled tooth 720, the reaction pin 716 has escaped, glided, moved, slipped, rolled, rotated, or slid into and is positioned in the valley 718. Sequence of movements of the reaction pin 716 into the valley 718 also results in one or more audible clicks caused by the reaction pin 716 landing in the valley 718. Movement of the reaction pin 716 along the plurality of angled teeth 720 may continue, as the handle shaft 420 moves in the first direction 408, for each successive angled tooth 720 while a torque is applied to the handle shaft 420. When the handle shaft 420 is released or no further force is applied to it, the torque of the return spring 628 is sufficient to overcome counteracting forces of the torsion spring 604 and frictional forces to smoothly return the reaction pin 716 to the home position.

Figure 8:
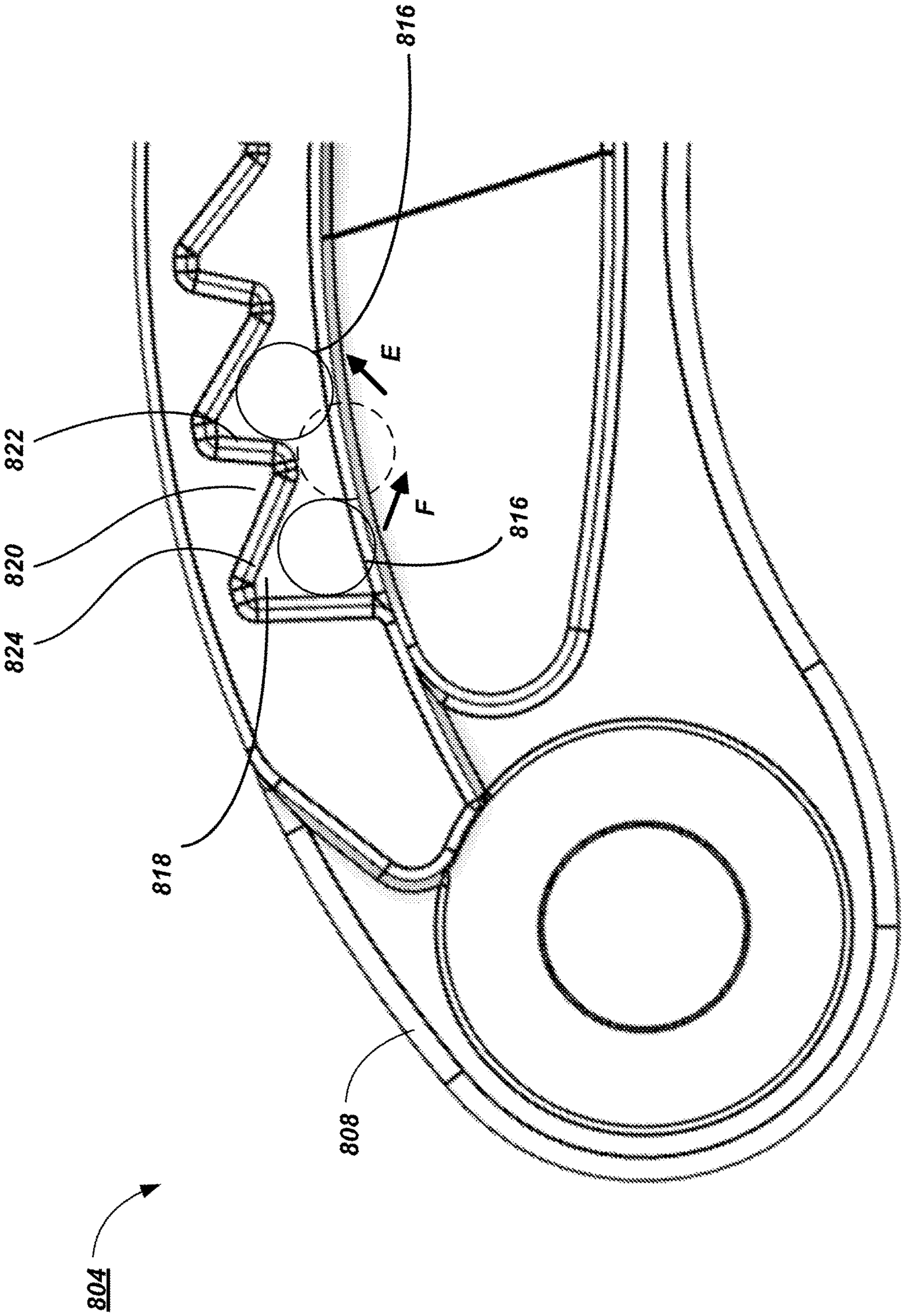
FIG. 8 illustrates aspects of an exemplary reverse operation of a back-driving handle assembly.

FIG. 8 illustrates an exemplary, partial reverse operation of a back-driving handle assembly 804 when the handle shaft 420 (of FIG. 4A) is forcibly driven in the reverse or second direction B and a reaction pin 816 (similar to the pin 616) moves along a plurality of angled teeth 820 (similar to the angled teeth 520) on a ratchet plate 808 (similar to the ratchet plate 508). Like numerals refer to like parts, wherein some parts are removed for clarity purposes.

As illustrated in FIG. 8, the handle assembly 424 (of FIG. 4A) rotates in the second path B (of FIG. 4A) responsive to an added reverse force applied to the handle shaft 420 (of FIG. 4A). The added reverse force at the handle shaft 420 in the second path B (of FIG. 4A) increases the contact force of the reaction pin 816 (similar to the pin 616) against the plurality of teeth 820. Instead of locking up, i.e. preventing movement, of the handle shaft 420, the configuration of the plurality of teeth 820, balanced by the torque generated by the torsion spring 604 (of FIG. 6A) and the return spring 628 (of FIG. 6D), allows the reaction pin 816 to escape, glide, move, slip, rolled, rotated, or slid from its resting position in the valley or dip 818 on a ratchet plate 808 (similar to the ratchet plate 508) along path F from a second side 824 to path E along a first side 822 toward the home position with little or no damage to the plurality of teeth 820 or other components of the handle assembly 424. In the embodiment shown, the reaction pin 816 pins against angled tooth 820, which provides a moment against the torsion spring 604 (of FIG. 6A) since the second angle is greater than 90°. In this way, when excessive torque is applied, the reaction pin 816 may be allowed to escape, glide, move, slip, roll, rotate, or slide past one or more of the angled teeth 820 due to the second angle and the counteracting springs—the return spring and the torsion spring. That is, as a result of configuring at least one other angled teeth as described and balancing or tuning the torque generated by the torsion spring 604 (of FIG. 6A) and the return spring 628 (of FIG. 6D), the plurality of angled teeth 820 can be protected from failure and lock up in response to abnormal reverse forces imparted at the handle shaft 420, while allowing the back-driving handle assembly 804 and the handle shaft 420 (of FIG. 4A) to return to the home position. The sliding movement of pin 816 in relation to the angled tooth 820 is therefore able to counteract overloading conditions that can damage handle shaft 420.

While repeated reverse loading over time may ultimately result in the failure of the pawl or the reaction pin, the handle assembly 424, even where that repetitive reverse loading condition occurs, will retain a degree of operational capacity unlike conventional design handle assemblies for gaming machines 104X that lock up or result in broken parts or components. Nonetheless, examples disclosed herein reduce the need for costly onsite handle assembly replacement by field technicians due to reverse loading of handle assemblies, and minimize game machine 104X downtime for the gaming operator.

Figure 9:
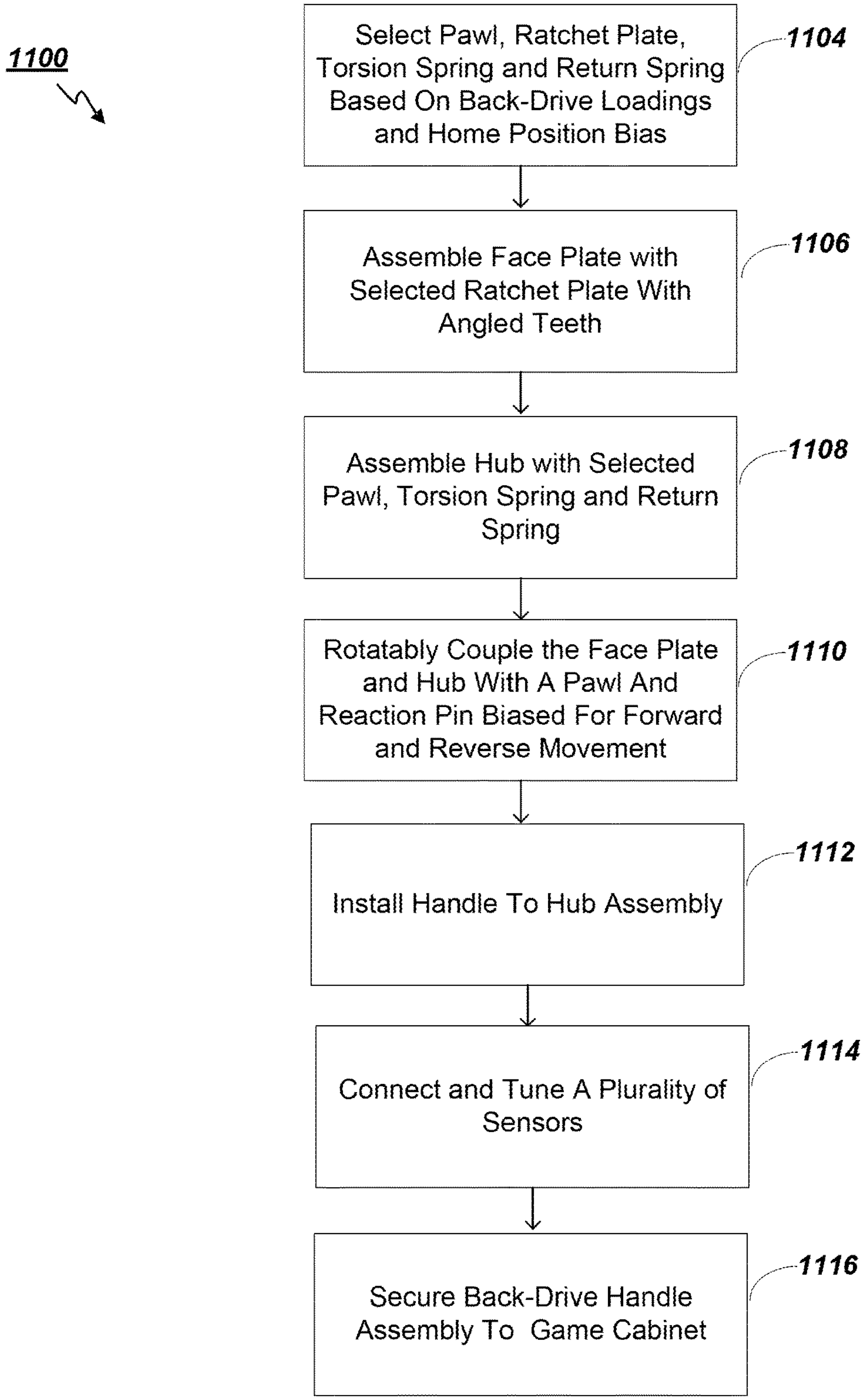
FIG. 9 illustrates an exemplary process of assembling a gaming machine having a back-driving handle assembly in accordance with various implementations described herein.

FIG. 9 illustrates an exemplary process 1100 of configuring and assembling a back-driving handle assembly (similar to the back-driving handle assembly 804 of FIG. 8). Like numerals refer to like parts, wherein some parts are removed for clarity purposes. Some or all of the steps in the process 1100 do not need to be arranged in the order specified or be included in the assembly provided for in this example.

In step 1104, a pawl, ratchet plate, torsion spring and return spring are configured and selected based on back-drive loadings and home position return bias of the back-driving handle assembly. In some examples, ratchet components including the pawl, ratchet plate, the angled teeth, the shoulder screw, the torsion spring and return spring, are assembled together to be tuned for the back-drive loadings and to generate the home position return bias of the handle. For example, the hub assembly is configured so that a handle shaft moves in a first direction (a forward torque, a downward torque, or a downward direction) responsive to a force exerted at the handle shaft, the reaction pin is configured to escape, glide, move, slip, roll, rotate, or slide over a first side of one of the angled teeth, as discussed with respect to FIG. 8. Here, the return spring (similar to the return spring 628 of FIG. 6B) is tuned to counteract the torsion spring to bias the handle to the home position.

However, when the handle shaft moves in a second direction (a reverse torque, an upward torque, or an upward direction) responsive to a force pushing the handle shaft 420 upward, and when the upward torque is less than a threshold of torque, the reaction pin will be restrained by a second side of an angled tooth. On the other hand, when the upward torque is greater than a threshold, the reaction pin will escape, glide, move, slip, roll, rotate, or slide over or past one or more of the angled teeth.

In step 1106, the ratchet plate (similar to the ratchet plate 436 of FIG. 4D) having a plurality of angled teeth is fixed to a face plate (similar to the face plate 428 of FIG. 4D). In some examples, the ratchet plate may be integral with the face plate.

In step 1108, the hub assembly (similar to the hub assembly 600 of FIG. 6A) is assembled with a pawl (similar to the pawl 612 of FIG. 6A) having a reaction pin (similar to the reaction pin 616 of FIG. 6A) that protrudes from the pawl, a torsion spring (similar to the torsion spring 444 of FIG. 4D) with a shoulder screw (similar to the shoulder screw 608 of FIG. 6A). The torsion spring is biased against the reaction pin such that the reaction pin is biased outwardly as described with respect to FIG. 6A.

In step 1110, the hub assembly may be rotatably coupled to the face plate such that the back-driving handle assembly is tuned for forward and reverse handle movements. At step 1112, the handle is installed to the hub assembly.

In step 1114, one or more pairs of sensors are tuned to detect at least a rotational position of the hub assembly or the handle shaft. When the sensors have been secured to the face plate or the hub assembly, at step 1116, the back-drive handle assembly is secured the gaming cabinet and connected to the game cabinet gaming components.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An assembly for a gaming handle on a gaming machine, a reverse drive protection assembly comprising:

a face plate operable to be fixed to the gaming machine;

a ratchet plate on the face plate, the ratchet plate comprising a plurality of angled teeth, each angled tooth of the plurality of angled teeth having a first side and a second side; and a hub attached to the face plate, the hub comprising a torsion spring attached to at least one reaction hole, a return spring, and a reaction pin, and being rotatable in a first direction from a first position with respect to the face plate, and rotatable from a second position in a second direction opposite the first direction to the first position, the reaction pin engaging the torsion spring, and the torsion spring counteracting the return spring thereby initiating a return bias for the hub to return to the first position, wherein the reaction pin is operable to move over the first side of at least one of the plurality of angled teeth responsive to a first external torque being applied to move the hub in the first direction, and to move over the second side of at least one of the plurality of angled teeth responsive to a second external torque exceeding the return bias being applied to move the hub in the second direction.

2. The assembly of claim 1, wherein the face plate further includes a dowel abutting against the return spring to counteract the torsion spring to rotatably return the hub back to the first position.

3. The assembly of claim 2, wherein the return spring is tuned to balance the torsion spring.

4. The assembly of claim 1, wherein the first side has a first slope determined from an angle of contact with the reaction pin, and the second side has a second slope that is different from the first slope.

5. The assembly of claim 4, wherein the first slope is larger than the second slope.

6. The assembly of claim 1, further comprising a plurality of sensors operable to contact the reaction pin when the hub is rotated to determine whether the hub is at the first position or away from the first position.

7. The assembly of claim 1, wherein the reaction pin is operable to slip past the second side of at least one of the plurality of angled teeth when the second external torque in the second direction is greater than the return bias, and to be restrained by the second side when the second external torque in the second direction is less than the return bias.

8. A gaming machine comprising:

a cabinet;

a face plate fixed to the cabinet, having a ratchet plate, the ratchet plate including a plurality of angled teeth, each angled tooth of the plurality of angled teeth having a first side and a second side;

a lever assembly coupled to the face plate, having a return spring, and being rotatable between a first direction with respect to a first position, and a second direction opposite the first direction, responsive to an external torque in a respective direction; and a pawl rotatably fixed to the lever assembly, and having a reaction pin attached to a torsion spring, the torsion spring counteracting the return spring to initiate a return bias to return the lever assembly to the first position, and the reaction pin being biased with the torsion spring to slide over the first side of at least one angled tooth of the plurality of angled teeth responsive to the external torque moving in the first direction, and to glide past the second side of at least one of the plurality of angled teeth responsive to the external torque exceeding the return bias in the second direction.

9. The gaming machine of claim 8, wherein the face plate further includes a dowel abutting against the return spring to counteract the torsion spring to move the lever assembly towards the first position.

10. The gaming machine of claim 9, wherein the return spring is tuned to balance the torsion spring.

11. The gaming machine of claim 8, wherein the first side has a first slope with respect to an angle of contact with the reaction pin, and the second side has a second slope that is different from the first slope.

12. The gaming machine of claim 11, wherein the first slope is larger than the second slope.

13. The gaming machine of claim 8, further comprising a plurality of sensors operable to contact the reaction pin when the lever assembly is rotated to determine whether the lever assembly is at the first position or away from the first position.

14. The gaming machine of claim 8, wherein the reaction pin is operable to: (i) glide past the second side of at least one angled tooth of the plurality of angled teeth when the external torque in the second direction is greater than the return bias, and (ii) be restrained by the second side when the external torque in the second direction is less than the return bias.

15. A method of assembling a gaming machine having a cabinet, the method comprising:

securing a ratchet plate having a plurality of angled teeth to a face plate, the face plate defining a first position, each angled tooth of the plurality of angled teeth having a first side and a second side;

biasing a reaction pin against a torsion spring in a hub such that the reaction pin is biased outwardly, the hub being movable between a first direction from the first position, and a second direction opposite the first direction, responsive to an external torque in a respective direction;

counteracting the torsion spring with a return spring to generate a return bias to rotatably return the hub to the first position;

rotatably coupling the hub to the face plate, the reaction pin being biased against one of the plurality of angled teeth, such that the reaction pin is operable to slide over the first side of at least one angled tooth of the plurality of angled teeth responsive to the external torque moving in the first direction, and to slip past the second side of at least one angled tooth of the plurality of angled teeth responsive to the external torque exceeding the return bias in the second direction; and securing the face plate to the cabinet.

16. The method of claim 15, further comprising abutting the return spring against a dowel on the face plate to counteract the torsion spring to move the hub towards the first position.

17. The method of claim 16, further comprising tuning the return spring to balance the torsion spring.

18. The method of claim 15, wherein the first side has a first slope determined from an angle of contact with the reaction pin, and the second side has a second slope that is different from the first slope, and wherein the first slope is larger than the second slope.

19. The method of claim 15, further comprising determining with a plurality of sensors whether the hub is at the first position or displaced from the first position.

20. The method of claim 15, wherein the reaction pin is operable to slip past the second side of at least one of the plurality of angled teeth when the external torque in the second direction is greater than the return bias, and to be restrained by the second side when the external torque in the second direction is less than the return bias.

* * * * *